United States Patent
Ogasawara

(10) Patent No.: US 8,973,912 B2
(45) Date of Patent: Mar. 10, 2015

(54) PRINTING CONTROL APPARATUS, CONTROL METHOD THEREOF, AND STORAGE MEDIUM

(71) Applicant: Canon Kabushiki Kaisha, Tokyo (JP)

(72) Inventor: Taku Ogasawara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 67 days.

(21) Appl. No.: 13/655,223

(22) Filed: Oct. 18, 2012

(65) Prior Publication Data

US 2013/0136563 A1     May 30, 2013

(30) Foreign Application Priority Data

Nov. 30, 2011   (JP) ................................. 2011-262652

(51) Int. Cl.
    *B41L 43/14*           (2006.01)
    *B41J 29/38*           (2006.01)
    *B42B 2/00*            (2006.01)

(52) U.S. Cl.
    CPC ... *B42B 2/00* (2013.01); *B41J 29/38* (2013.01)
    USPC ......... 270/52.19; 270/32; 270/45; 270/58.07; 270/58.23; 270/58.31

(58) Field of Classification Search
    CPC ........... B41L 43/02; B41L 43/14; B42C 1/10; B41F 13/68
    USPC ......... 270/52.19, 45, 32, 58.04, 58.07, 58.23, 270/58.31; 412/1, 11
    See application file for complete search history.

(56) References Cited

U.S. PATENT DOCUMENTS

| | | | | |
|---|---|---|---|---|
| 5,655,759 | A * | 8/1997 | Perkins et al. | 270/52.02 |
| 6,633,393 | B1 | 10/2003 | Fukano | |
| 6,976,672 | B2 * | 12/2005 | Kawata | 271/9.11 |
| 7,113,846 | B2 * | 9/2006 | Moriyama et al. | 700/223 |
| 7,281,707 | B2 | 10/2007 | Moriyama et al. | |
| 7,634,725 | B2 | 12/2009 | Nishikawa | |
| 7,905,478 | B2 * | 3/2011 | Tabuchi | 270/58.23 |
| 7,980,545 | B2 * | 7/2011 | Yokomizo | 270/58.32 |
| 2010/0183405 | A1 | 7/2010 | Nonaka | |

FOREIGN PATENT DOCUMENTS

| | | |
|---|---|---|
| CN | 1258883 A | 7/2000 |
| CN | 1669806 A | 9/2005 |
| CN | 1731819 A | 2/2006 |
| JP | 2007-123991 A | 5/2007 |
| JP | 2010-168134 A | 8/2010 |

OTHER PUBLICATIONS

Chinese Patent Office dated Sep. 9, 2014 issued in corresponding Chinese Patent Application No. 201210507188.X.

* cited by examiner

*Primary Examiner* — Leslie A Nicholson, III
(74) *Attorney, Agent, or Firm* — Fitzpatrick, Cella, Harper & Scinto

(57) ABSTRACT

A printing control apparatus according to one aspect of this invention controls to print images on sheets based on image data of a plurality of pages, generate a bookbinding product by executing folding processing for the image-printed sheets, and output the bookbinding product. The printing control apparatus further accepts the position of an insertion sheet to be inserted into the sheets for which the folding processing is executed, and controls to output a plurality of bookbinding products by using, as a reference, the accepted position of the insertion sheet.

20 Claims, 15 Drawing Sheets

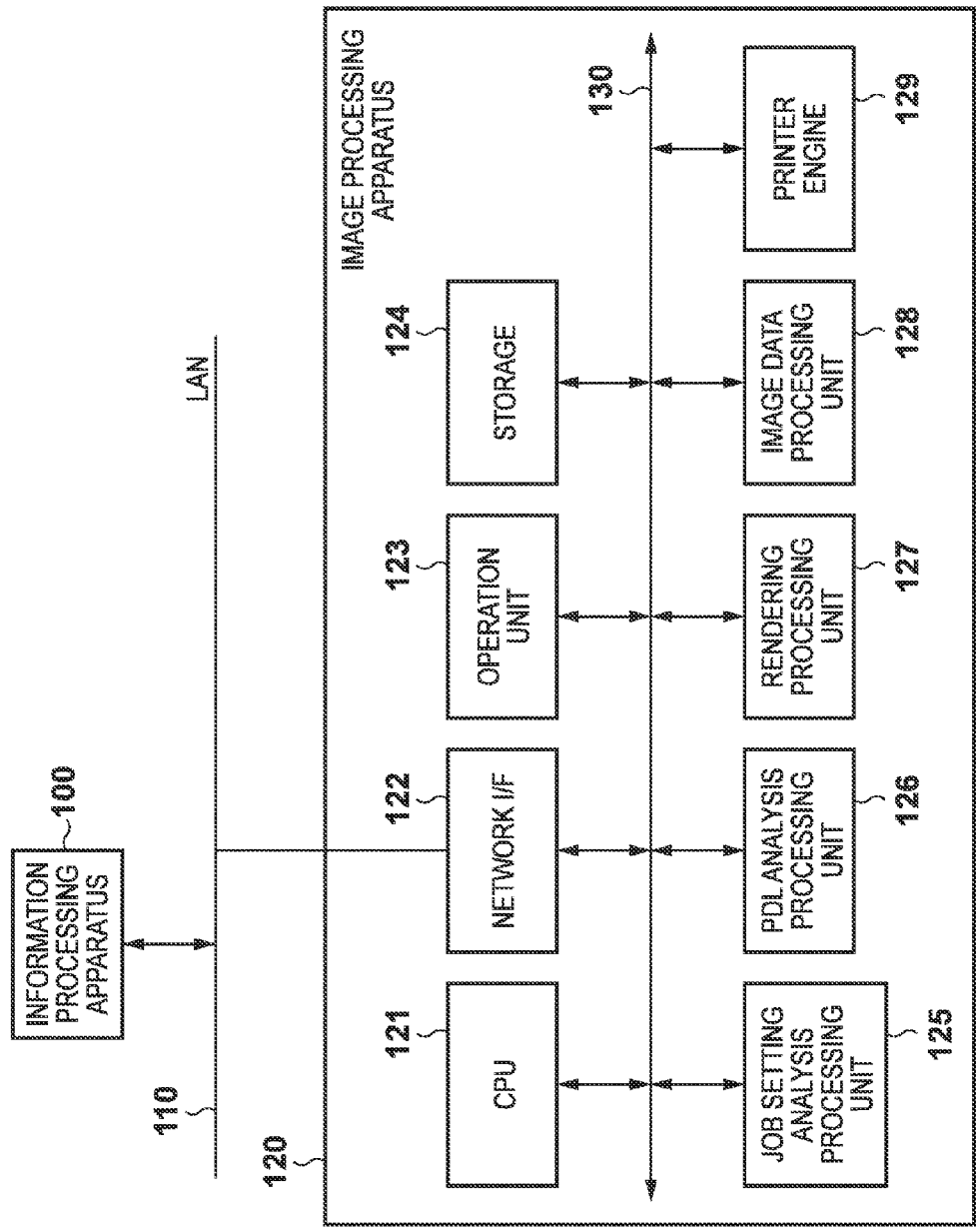

| PAGE SETTINGS | FINISHING SETTINGS | PAPER FEED | PRINT QUALITY |

PRINTING METHOD — BOOKBINDING PRINTING ▼ — 211

FOLDING SETTING — FOLD ▼ — 212

BOOKBINDING PRINTING PROCESSING METHOD
● PROCESS BY IMAGE PROCESSING APPARATUS
○ PROCESS BY PRINTER DRIVER
— 213

220

| PAGE SETTINGS | FINISHING SETTINGS | PAPER FEED | PRINT QUALITY |

PAPER FEED METHOD
● DESIGNATE BY PAPER TYPE
○ DESIGNATE BY PAPER FEED UNIT
— 221

SELECT PAPER FEED — USE INSERTION SHEET ▼ — 222

BODY SETTING — 223

INSERTION SHEET SETTING — 224

401
JOB ATTRIBUTE VALUES
<PRINTING METHOD>
· PRINTING METHOD = FOLDING/BOOKBINDING
<ORIGINAL SETTINGS>
· ORIGINAL PAGE COUNT = 12
· ORIGINAL SIZE = A4
<INSERTION SHEET SETTINGS>
· INSERTION FORMAT = FOLDING SIZE FORMAT
· PRINTING/NON-PRINTING ON INSERTION SHEET = NON-PRINTING
· INSERTION PAGE = 4
· PAPER FEED TRAY SETTING OF INSERTION SHEET = MANUAL FEED
· PAPER TYPE OF INSERTION SHEET = COLORED PAPER
<PAPER SETTINGS OF BODY>
· PAPER SIZE OF BODY = A3
· PAPER FEED TRAY SETTING OF BODY = CASSETTE 1
· PAPER TYPE OF BODY = PLAIN PAPER
...

402
PDL DATA
<START OF JOB>
<START OF FIRST PAGE> DRAWING CONTENTS OF FIRST PAGE <END OF FIRST PAGE>
<START OF SECOND PAGE> DRAWING CONTENTS OF SECOND PAGE <END OF SECOND PAGE>
<START OF THIRD PAGE> DRAWING CONTENTS OF THIRD PAGE <END OF THIRD PAGE>
<START OF FOURTH PAGE> DRAWING CONTENTS OF FOURTH PAGE <END OF FOURTH PAGE>
<START OF FIFTH PAGE> DRAWING CONTENTS OF FIFTH PAGE <END OF FIFTH PAGE>
<START OF SIXTH PAGE> DRAWING CONTENTS OF SIXTH PAGE <END OF SIXTH PAGE>
<START OF SEVENTH PAGE> DRAWING CONTENTS OF SEVENTH PAGE <END OF SEVENTH PAGE>
<START OF EIGHTH PAGE> DRAWING CONTENTS OF EIGHTH PAGE <END OF EIGHTH PAGE>
<START OF NINTH PAGE> DRAWING CONTENTS OF NINTH PAGE <END OF NINTH PAGE>
<START OF 10TH PAGE> DRAWING CONTENTS OF 10TH PAGE <END OF 10TH PAGE>
<START OF 11TH PAGE> DRAWING CONTENTS OF 11TH PAGE <END OF 11TH PAGE>
<START OF 12TH PAGE> DRAWING CONTENTS OF 12TH PAGE <END OF 12TH PAGE>
<END OF JOB>

F I G. 4B

411

JOB ATTRIBUTE VALUES
<PRINTING METHOD>
· PRINTING METHOD = FOLDING/BOOKBINDING
<ORIGINAL SETTINGS>
· ORIGINAL PAGE COUNT = 12
· ORIGINAL SIZE = A4
<INSERTION SHEET SETTINGS>
· INSERTION FORMAT = DOUBLE-PAGE SIZE FORMAT
· PRINTING/NON-PRINTING ON INSERTION SHEET = SINGLE-SIDED
· PRINTING SURFACE OF INSERTION SHEET = OBVERSE SURFACE
· INSERTION PAGE = 8
· PAPER FEED TRAY SETTING OF INSERTION SHEET = MANUAL FEED
· PAPER TYPE OF INSERTION SHEET = COATED PAPER
<PAPER SETTINGS OF BODY>
· PAPER SIZE OF BODY = A3
· PAPER FEED TRAY SETTING OF BODY = CASSETTE 1
· PAPER TYPE OF BODY = PLAIN PAPER
...

412

PDL DATA
<START OF JOB>
<START OF FIRST PAGE> DRAWING CONTENTS OF FIRST PAGE <END OF FIRST PAGE>
<START OF SECOND PAGE> DRAWING CONTENTS OF SECOND PAGE <END OF SECOND PAGE>
<START OF THIRD PAGE> DRAWING CONTENTS OF THIRD PAGE <END OF THIRD PAGE>
<START OF FOURTH PAGE> DRAWING CONTENTS OF FOURTH PAGE <END OF FOURTH PAGE>
<START OF FIFTH PAGE> DRAWING CONTENTS OF FIFTH PAGE <END OF FIFTH PAGE>
<START OF SIXTH PAGE> DRAWING CONTENTS OF SIXTH PAGE <END OF SIXTH PAGE>
<START OF SEVENTH PAGE> DRAWING CONTENTS OF SEVENTH PAGE <END OF SEVENTH PAGE>
<START OF EIGHTH PAGE> DRAWING CONTENTS OF EIGHTH PAGE <END OF EIGHTH PAGE>
<START OF NINTH PAGE> DRAWING CONTENTS OF NINTH PAGE <END OF NINTH PAGE>
<START OF 10TH PAGE> DRAWING CONTENTS OF 10TH PAGE <END OF 10TH PAGE>
<START OF 11TH PAGE> DRAWING CONTENTS OF 11TH PAGE <END OF 11TH PAGE>
<START OF 12TH PAGE> DRAWING CONTENTS OF 12TH PAGE <END OF 12TH PAGE>
<START OF 12TH PAGE> DRAWING CONTENTS OF 13TH PAGE <END OF 13TH PAGE>
<END OF JOB>

410

FIG. 8
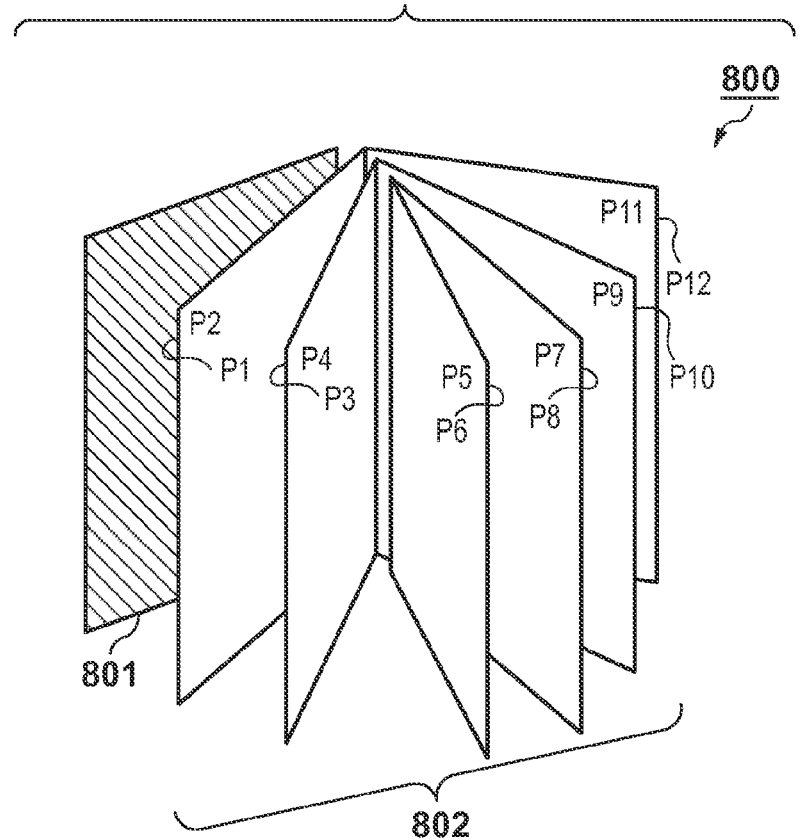
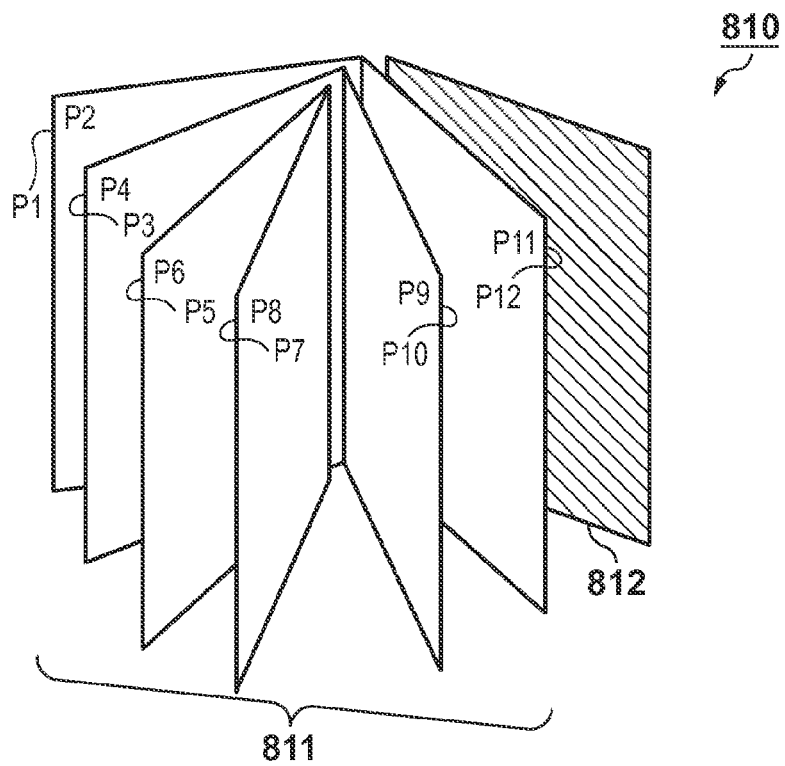

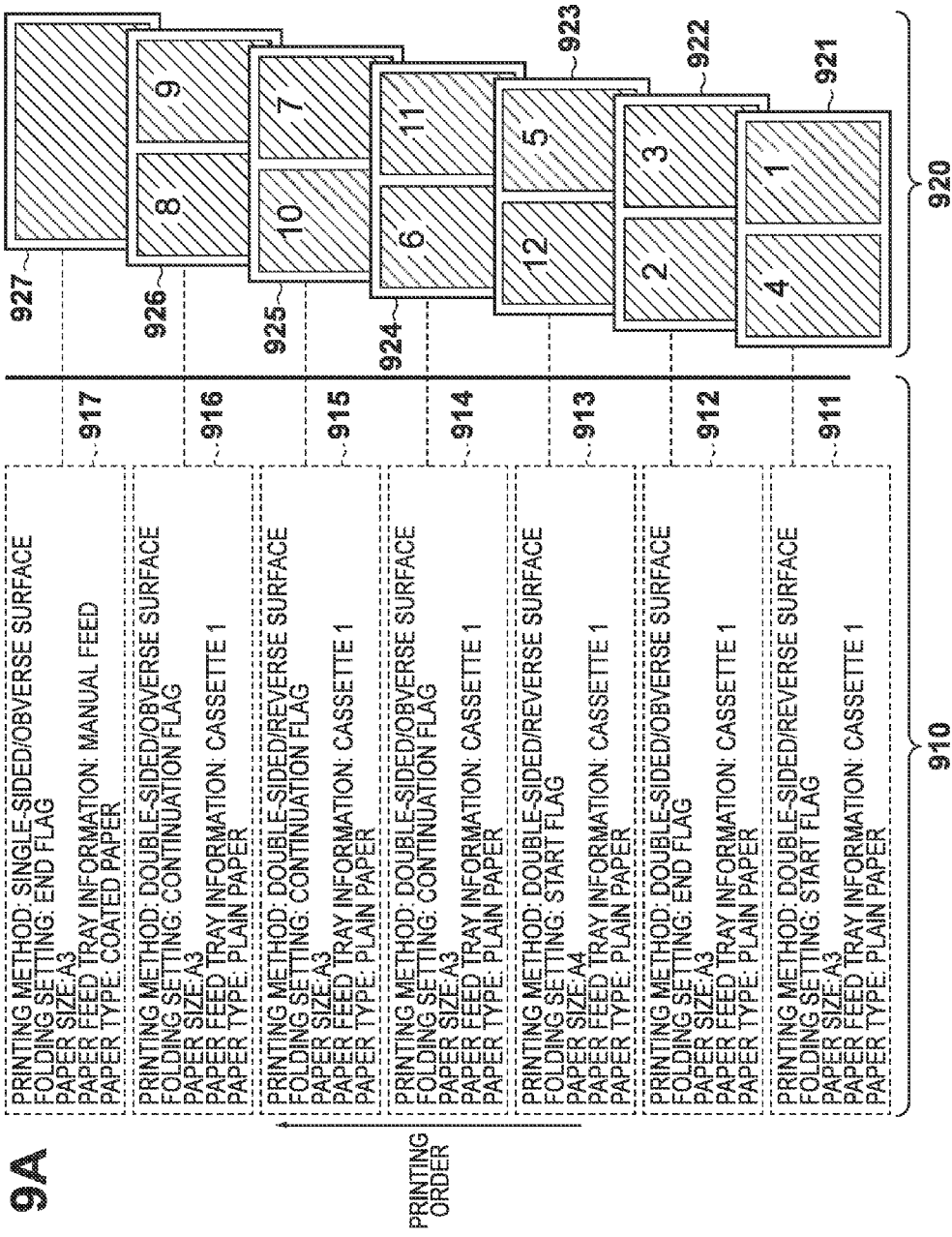

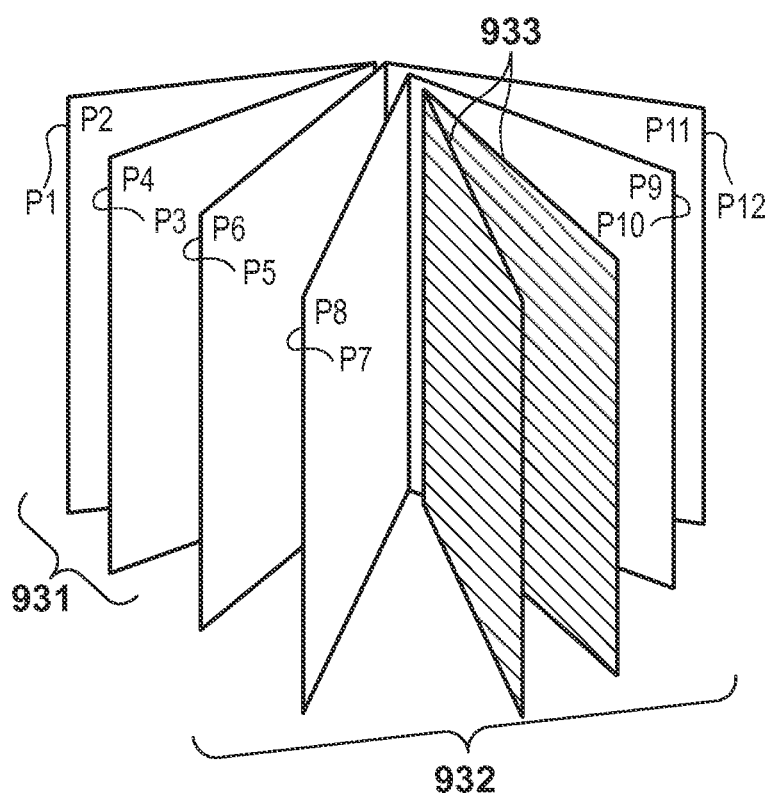

PRINTING CONTROL APPARATUS, CONTROL METHOD THEREOF, AND STORAGE MEDIUM

BACKGROUND OF THE INVENTION

1. Field of the Invention

The present invention relates to a printing control apparatus, control method thereof, and storage medium.

2. Description of the Related Art

Some image processing apparatuses such as a printer and multifunction peripheral have a bookbinding function for bundling a plurality of sheets (printed materials) on which images corresponding to original data are printed, and folding them in half (folding them in the middle) to generate a bookbinding product. For example, Japanese Patent Laid-Open No. 2010-168134 discloses an apparatus which can execute center folding bookbinding processing of bundling a plurality of printed materials and folding them in half to generate a bookbinding product, and saddle stitching processing of stapling along the fold of a bundle of printed materials folded in half to generate a bookbinding product.

Japanese Patent Laid-Open No. 2007-123991 discloses, as an image processing apparatus having a bookbinding function, an image processing apparatus which divides a plurality of printed materials, on which original images are printed, into a plurality of bundles and executes bookbinding processing (division bookbinding) for each individual bundle. This image processing apparatus can designate breaks of originals such as chapters and sections at division portions when dividing a plurality of printed materials into a plurality of bundles.

The above-described image processing apparatus having the bookbinding (folding bookbinding) function based on folding processing of folding a plurality of sheets in the middle may cause the following problem when a sheet other than sheets on which the body of the bookbinding product is printed is inserted at an arbitrary portion in the bookbinding product. A case in which a sheet having a size (folding size) obtained by folding in half a sheet forming a bookbinding product is inserted at an arbitrary portion in a bookbinding product generated by folding bookbinding, and a case in which a sheet having the same size (double-page size) as that of a sheet forming a bookbinding product is inserted at an arbitrary portion in a bookbinding product generated by folding bookbinding will be assumed. FIG. 11 exemplifies a case in which a sheet (insertion sheet) other than three sheets is inserted into a bookbinding product obtained by performing folding processing for these three sheets on which the original images of 12 pages of the body are printed on the two surfaces.

First, a bookbinding product 1101 is obtained by inserting a sheet of the folding size between the fourth and fifth pages of the body separately from three sheets corresponding to the body. To generate a bookbinding product such as the bookbinding product 1101, for example, it is conceivable to execute folding processing for sheets of the body and then insert a sheet of the folding size between the fourth and fifth pages of the body. However, it is generally known that it is difficult in terms of the apparatus arrangement to generate the bookbinding product 1101 in this way.

When a sheet of the folding size is inserted between the fourth and fifth pages of the body before executing folding processing for sheets of the body, a bookbinding product such as a bookbinding product 1102 may be generated as a result of the folding processing. More specifically, when an inserted sheet of the folding size is not properly aligned with body sheets of the double-page size, the inserted sheet may be inserted not only between the fourth and fifth pages of the body but also between the eighth and ninth pages of the body against the user's will.

Also, when inserting a sheet of the double-page size at an arbitrary portion in a bookbinding product obtained by folding bookbinding, assuming that the entire surface of the sheet to be inserted is printed, the sheet is desirably inserted to be able to spread it. However, to enable spread of the sheet inserted into the bookbinding product, the inserted sheet needs to be positioned innermost (that is, as the center pages of the bookbinding product to be generated) as a result of superposing and folding a plurality of sheets. In other cases, no inserted sheet can be spread as represented by a bookbinding product 1103. In the bookbinding product 1103, the inserted sheet is separately inserted between the fourth and fifth pages of the body and also between the eighth and ninth pages. In this case, the user cannot confirm the printed contents of the inserted sheet while spreading the inserted sheet.

SUMMARY OF THE INVENTION

The present invention has been made to solve the above problems. The present invention provides a technique of, when an image processing apparatus performs bookbinding based on folding processing for a plurality of sheets, generating a bookbinding product in which another sheet of a size obtained by folding the sheets in half or the same size as that of the sheets is appropriately inserted.

According to one aspect of the present invention, there is provided a printing control apparatus which controls to print images on sheets based on image data of a plurality of pages, generate a bookbinding product by executing folding processing for the image-printed sheets, and output the bookbinding product, comprising: an acceptance unit configured to accept a position of an insertion sheet to be inserted into the sheets for which the folding processing is executed; and a control unit configured to output a plurality of bookbinding products by using, as a reference, the position of the insertion sheet that has been accepted by the acceptance unit.

According to another aspect of the present invention, there is provided a method of controlling a printing control apparatus which controls to print images on sheets based on image data of a plurality of pages, generate a bookbinding product by executing folding processing for the image-printed sheets, and output the bookbinding product, comprising: accepting a position of an insertion sheet to be inserted into the sheets for which the folding processing is executed; and controlling to output a plurality of bookbinding products by using, as a reference, the position of the insertion sheet that has been accepted in the accepting.

The present invention can provide a technique of, when an image processing apparatus performs bookbinding based on folding processing for a plurality of sheets, generating a bookbinding product in which another sheet of a size obtained by folding the sheets in half or the same size as that of the sheets is appropriately inserted.

Further features of the present invention will become apparent from the following description of exemplary embodiments (with reference to the attached drawings).

BRIEF DESCRIPTION OF THE DRAWINGS

FIG. 1 is a block diagram showing the arrangement of a printing system according to the first embodiment;

FIG. 2 is a view exemplifying setting screens regarding finishing settings and paper feed settings according to the first embodiment;

FIG. 4A is a view exemplifying the contents of a print job which is created by a printer driver and includes settings using an insertion sheet of the folding size according to the first embodiment;

FIG. 4B is a view exemplifying the contents of a print job which is created by the printer driver and includes settings using an insertion sheet of the double-page size according to the first embodiment;

FIG. 8 is a view exemplifying bookbinding products generated when the insertion page M of an insertion sheet of the folding size format=0 (first page) and 12 (final page) according to the first embodiment;

FIG. 9A is a view exemplifying print setting data and image data generated by layout processing when an insertion sheet of the double-page size format is used according to the first embodiment;

FIG. 9B is a view exemplifying a bookbinding product generated based on the print setting data and image data in FIG. 9A;

DESCRIPTION OF THE EMBODIMENTS

Figure 3:
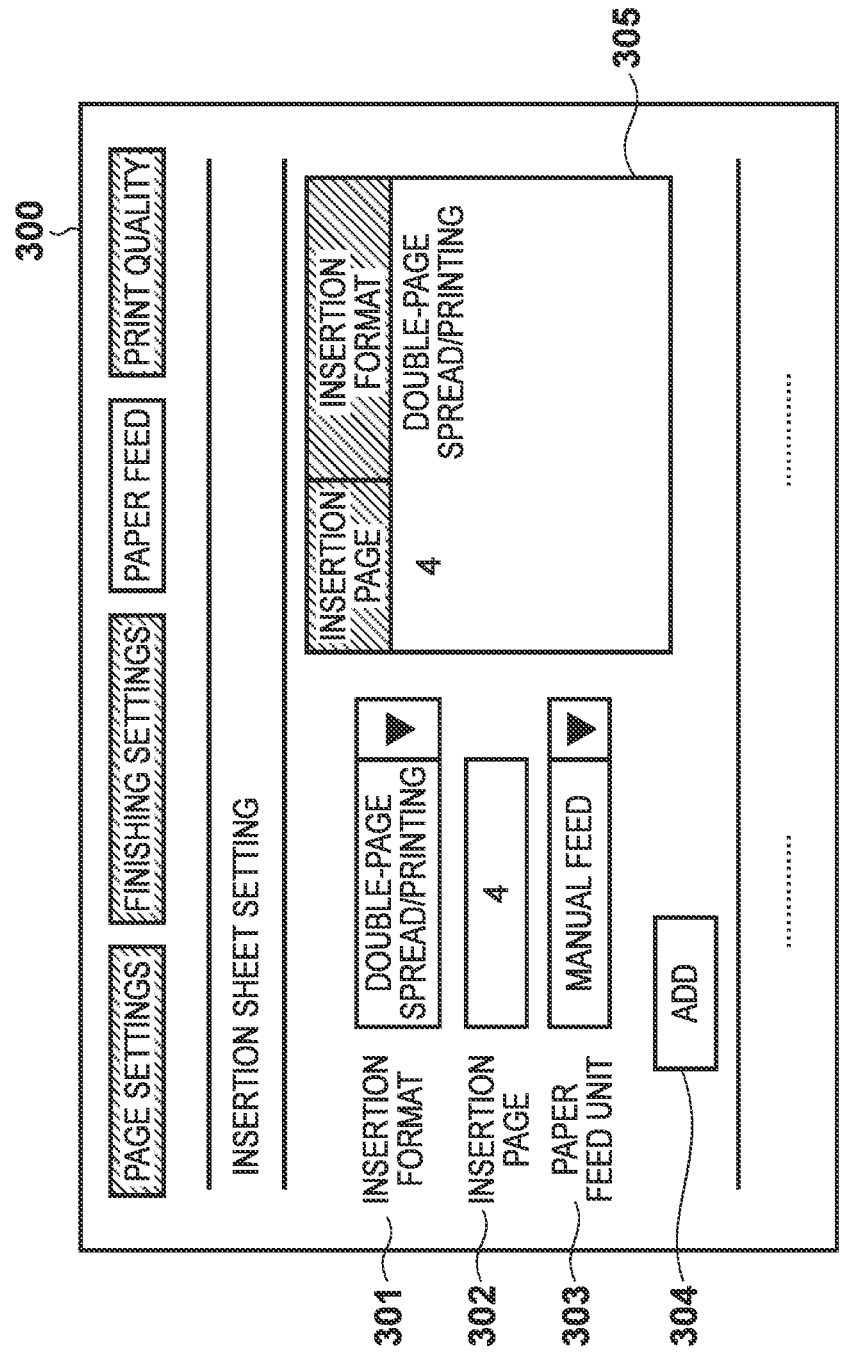
FIG. 3 is a view exemplifying a setting screen regarding insertion sheet settings according to the first embodiment.

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

The first embodiment will now be described with reference to FIGS. 1 to 10. This embodiment will explain a case in which, in a printing system including an information processing apparatus and image processing apparatus, the image processing apparatus executes layout processing for image data to undergo bookbinding printing based on a print job created by a printer driver in the information processing apparatus.

<Arrangements of Printing System and Image Processing Apparatus>

The arrangement of the printing system and that of an image processing apparatus 120 in the printing system according to the embodiment will be explained with reference to FIG. 1. The printing system shown in FIG. 1 includes an information processing apparatus 100 and the image processing apparatus 120. The information processing apparatus 100 and image processing apparatus 120 are connected via a LAN 110 to be able to communicate with each other.

As shown in FIG. 1, the image processing apparatus 120 includes a plurality of modules which are connected to each other via a system bus 130. A CPU 121 controls the overall image processing apparatus 120 and performs image processing. The image processing apparatus 120 receives, from the information processing apparatus 100 via the LAN 110 and a network interface (I/F) 122, a print job created by using software such as a printer driver in the information processing apparatus 100.

In the image processing apparatus 120, when the CPU 121 accepts (receives) a print job from the information processing apparatus 100 via the network I/F 122, it saves the accepted print job in a reception area within the storage area of a storage 124. A job setting analysis processing unit 125 analyzes information about finishing settings made for the received print job, and temporarily saves the analysis result as setting information of the print job in the storage 124. A PDL analysis processing unit 126 performs PDL analysis for the received print job, generating intermediate data. A rendering processing unit 127 performs drawing (rendering) processing based on the intermediate data generated by the PDL analysis processing unit 126, generating drawing data.

An image data processing unit 128 saves, in the storage 124, image data generated by performing layout processing for bookbinding printing (to be referred to as "bookbinding layout processing" or simply as "layout processing" hereinafter) for the generated drawing data. The CPU 121 outputs the image data saved in the storage 124 to a printer engine 129. The printer engine 129 performs image print processing based on the image data on a sheet (print sheet). If necessary, the printer engine 129 executes folding processing to bundle a plurality of image-printed sheets and fold them in the middle by using a saddle (not shown), performing bookbinding printing for these sheets and generating a bookbinding product. In this manner, the printer engine 129 implements bookbinding printing based on input image data.

In the embodiment, the image processing apparatus 120 corresponds to an image processing apparatus which generates image data for bookbinding printing of printing images corresponding to original data on a plurality of sheets of the double-page size (first size), bundling the printed sheets, and folding them in the middle to generate a bookbinding product. In a bookbinding product generated using image data generated by the image processing apparatus 120, each page has a folding size (second size) which is half the double-page size.

In the embodiment, original data corresponding to the original of each page before rendering processing by the rendering processing unit 127 will be called "PDL data", and original data corresponding to the original of each page after rendering processing will be called "drawing data". Data to undergo print processing after layout processing by the image data processing unit 128 will be called "image data". Note that details of rendering processing and layout processing by the rendering processing unit 127 and image data processing unit 128 will be explained with reference to a flowchart shown in FIGS. 5A and 5B.

<Settings Regarding Insertion of Sheet into Bookbinding Product>

Generation of a print job for inserting, at an arbitrary portion (position) in a bookbinding product obtained by folding bookbinding, a sheet other than those corresponding to the body of the bookbinding product in the information processing apparatus 100 will be explained with reference to FIGS. 2 and 3. Generation of a print job in the information processing apparatus 100 uses the printer driver or the like.

In this specification, a sheet to be inserted into a bookbinding product will be called an "insertion sheet". As the insertion sheet, the embodiment uses different types of sheets having a size (folding size) which is half the size of sheets when the sheets corresponding to the body forming a bookbinding product obtained by folding bookbinding are folded in half (in the middle), and having the same size (double-page size) of that of the sheets corresponding to the body. The double-page size corresponds to a paper size when the bookbinding product is spread. In the embodiment, the "double-page size" corresponds to the first size, and the "folding size" corresponds to the second size.

A setting screen 210 regarding finishing settings in FIG. 2 is, for example, an operation screen displayed on the display (display device) of the information processing apparatus 100 by the printer driver in the information processing apparatus 100. The user can make settings via the operation screen using an input device (for example, keyboard or mouse) arranged in the operation unit of the information processing apparatus 100.

The printer driver in the information processing apparatus 100 accepts folding bookbinding settings via the setting screen 210 regarding finishing settings. The printer driver accepts a selection instruction "single-sided printing", "double-sided printing", or "bookbinding printing" as a printing method 211. When the printer driver accepts the selection instruction "bookbinding printing" as the printing method, it can accept a selection instruction about a folding setting 212. As the folding setting 212, the printer driver accepts a selection instruction "not set" or "fold". When the printer driver accepts the setting "bookbinding printing" as the printing method 211 and the setting "fold" as the folding setting 212, it generates a folding bookbinding job as a print job.

The printer driver accepts, in a bookbinding printing processing method item 213, a selection instruction representing which of the image processing apparatus 120 and printer driver (information processing apparatus 100) is to execute layout processing. The first embodiment will explain a case in which the image processing apparatus 120 executes layout processing. Note that the second embodiment will explain a case in which the printer driver (information processing apparatus 100) executes layout processing. The layout processing is also called "imposition processing", and corresponds to processing of laying out (imposing) a plurality of pages to be included in a bookbinding product as a result of bookbinding by performing folding processing for sheets by folding bookbinding or the like so that sheets corresponding to the originals of respective pages are bound in a correct order.

As the bookbinding method, the setting screen 210 may further enable setting of whether to perform binding processing of saddle-stitching sheets and then performing folding processing for the sheets to bind them, and selection of left-opening bookbinding or right-opening bookbinding. The embodiment will describe a case in which bookbinding processing is performed by left-opening bookbinding.

Then, the printer driver in the information processing apparatus 100 accepts settings about the use of an insertion sheet via a setting screen 220 regarding paper feed settings. The printer driver accepts, in an item 221, which of the paper type and paper feed unit is used to designate paper feed methods for sheets of the body and an insertion sheet. The printer driver accepts, in an item 222, designation of whether to use an insertion sheet. When the use of an insertion sheet is designated, the printer driver can accept selection instructions about a paper setting 223 of the body and a paper setting 224 of the insertion sheet. As the paper setting 223 of the body, the printer driver can accept a selection instruction "paper feed tray designation" or "paper type designation" (not shown). When the insertion sheet setting item 224 is selected, the printer driver displays, on the display of the information processing apparatus 100, a setting screen 300 (FIG. 3) for making detailed settings of an insertion sheet, and accepts further settings.

On the insertion sheet setting screen 300, the printer driver accepts designation instructions about an insertion format 301, an insertion page 302, and a paper feed unit 303 serving as the paper feed source of an insertion sheet, and reflects setting contents based on the designations in a display field 305. As the insertion format 301, a combination of the use of an insertion sheet of the folding size or an insertion sheet of the double-page size, and printing/non-printing on an insertion sheet can be selected. More specifically, the printer driver can accept a selection instruction about the insertion format 301 from the following six combinations: "folding size and non-printing", "folding size and printing on the obverse surface", "folding size and printing on the reverse surface", "folding size and printing on the two surfaces", "double-page size and non-printing", and "double-page size and printing".

The printer driver can accept, as the insertion page 302, a numerical value indicating a position where an insertion sheet is to be inserted in a bookbinding product. The insertion page is a numerical value representing that an insertion sheet is to be inserted between this page and the next page. In the embodiment, when the printer driver has accepted a setting of executing folding bookbinding on the setting screen 210, it inhibits input of a fraction as an insertion page on the setting screen 300.

The fraction of an insertion page in folding bookbinding will be explained. In layout processing for folding bookbinding, original data of the originals of a plurality of pages are assigned to one sheet. In general, when one sheet undergoes folding processing and is folded in half, images based on original data of two pages are printed on each of the obverse and reverse surfaces of the sheet, and original data of the originals of four pages are assigned to one sheet. In the embodiment, the image processing apparatus 120 lays out original data of two pages for each image data corresponding to the obverse or reverse surface of a sheet of the double-page size to be printed. As a result, the image processing apparatus 120 assigns original data of every four pages to each sheet to be printed, and generates image data for bookbinding printing. Further, the image processing apparatus 120 performs print processing for each sheet based on the generated image data, bundles obtained printed materials, and folds them in the middle, generating a bookbinding product.

In the embodiment, as will be described later, the image processing apparatus 120 performs division processing in every four pages for drawing data of a plurality of pages after rendering processing by using, as a reference, an insertion position where an insertion sheet is to be inserted in a bookbinding product to be finally generated. For this reason, the image processing apparatus 120 accepts only a print job which designates, as the insertion position of an insertion sheet, a position where pages corresponding to original data of every four pages are included before the insertion position in a bookbinding product to be generated. If pages corresponding to original data of every four pages do not exist before a designated insertion position (insertion page), the designated insertion page becomes a fraction.

When designation of a fraction as an insertion page is permitted, if an insertion sheet of the folding size is designated, a blank page is required before the insertion page unless a multiple of 4, the first page (M=0), or the final page is designated as an insertion page M. If an insertion sheet of the double-page size is designated, blank pages need to be added before the insertion page unless double the designated insertion page M (=2M) is a multiple of 4.

In the embodiment, when the printer driver in the information processing apparatus 100 accepts input of a fraction of an insertion page, it displays a screen on the display to notify the user of a message to this effect, and prompts him not to input the fraction.

On the setting screen 300, the printer driver accepts designation of a paper feed tray arranged in the image processing apparatus 120 as the paper feed unit 303 for feeding an insertion sheet. The designation of the paper feed tray depends on the apparatus arrangement of the image processing apparatus 120. For example, cassette 1, cassette 2, inserter, and manual feed are selectable. Note that the printer driver can acquire information about the apparatus arrangement of the image processing apparatus 120 and the like via the LAN 110. This information also includes information representing the arrangement of paper feed trays in the image processing apparatus 120.

Upon accepting pressing of an add button 304, the printer driver displays (reflects) contents designated as the insertion format 301, insertion page 302, and paper feed unit 303 in the display field 305.

The printer driver accepts settings regarding folding bookbinding and an insertion sheet in this manner. If the printer driver accepts a job execution instruction, it generates a print job based on the setting contents. Further, the printer driver transmits the generated print job to the image processing apparatus 120 via the LAN 110.

<Example of Structure of Print Job>

The structure of a print job which is created by the printer driver in the information processing apparatus 100 to generate a bookbinding product by folding bookbinding will be exemplified with reference to FIGS. 4A and 4B. FIG. 4A exemplifies the structure of a print job 400 including settings using an insertion sheet of the folding size. FIG. 4B exemplifies the structure of a print job 410 including settings using an insertion sheet of the double-page size. The print jobs 400 and 410 are roughly formed from two portions: job attribute portions 401 and 411, and PDL data portions 402 and 412.

Each of the job attribute portions 401 and 411 includes settings (job attribute values) necessary for print settings, and mainly includes the job attribute values of items (for example, printing method, finishing settings, and paper settings) set using the setting screens 210, 220, and 300 shown in FIGS. 2 and 3. As setting examples of the job attribute values of respective items included in the job attribute portions 401 and 411, those pertaining to the embodiment will be listed below. Note that the job attribute portions 401 and 411 can include settings other than the following ones.

[Printing Method]
    printing method: folding bookbinding, double-sided printing, single-sided printing, or the like

[Original Settings]
    original page count: numerical value indicating the number of original pages
    original size: paper size such as A4, A3, LTR, or LGL
    (The size of drawing data can also be designated and may be included in the PDL data portion)

[Insertion Sheet Settings]
    insertion format: folding size format or double-page size format
    (When the folding size format or double-page size format is set, an insertion sheet is used)
    printing/non-printing: non-printing, single-sided printing (obverse surface or reverse surface), or double-sided printing
    insertion page: numerical value indicating the insertion position of an insertion sheet
    (For example, for 4, an insertion sheet is inserted between the fourth and fifth pages)

[Body Settings]
    paper size of body: A4, A3, LTR, LGL, or the like
    paper type of body: plain paper, thick paper, thin paper, coated paper, special paper, or the like
    paper feed tray setting of body: cassette 1, cassette 2, manual feed, or the like

[Others]
    for example, the number of original pages assigned to one sheet (4 in the embodiment)

PDL data included in the PDL data portions 402 and 412 are described based on the PDL language specifications, and include data representing drawing contents for each page. Note that the PDL data portions 402 and 412 include descriptions such as finishing settings complying with the PDL language specifications.

The print job 400 is a job which assigns the A4-size originals of 12 pages to the body of a bookbinding product, and executes folding bookbinding processing using A3-size plain paper. The print job 400 is set to insert colored paper of the folding size (A4 size) between the fourth and fifth pages of the body without printing. In contrast, the print job 410 is a job which assigns the A4-size originals of 12 pages to the body of a bookbinding product, executes folding bookbinding processing using A3-size plain paper, and inserts coated paper of the double-page size (A3 size) between the eighth and ninth pages of the body upon printing.

In the print job 410, the PDL data portion 412 stores PDL data corresponding to an A3-size insertion sheet next to PDL data corresponding to an A4-size original assigned to the eighth page. In the print job 410, a size (double-page size) corresponding to PDL data representing the drawing contents of an insertion sheet differs from a paper size (folding size) corresponding to PDL data representing the drawing contents of each page of the body. In the embodiment, as represented by the print job 410, the PDL data portions 402 and 412 can describe PDL data corresponding to the drawing contents of pages of different sizes to coexist without requiring special processing.

In this fashion, each of the print jobs 400 and 410 includes original data (PDL data) of a plurality of pages corresponding to the body of a bookbinding product, and setting data which designate the size (insertion format) and an insertion position (insertion page) of an insertion sheet to be inserted into the bookbinding product.

<Bookbinding Processing in Image Processing Apparatus>

Figure 5A:
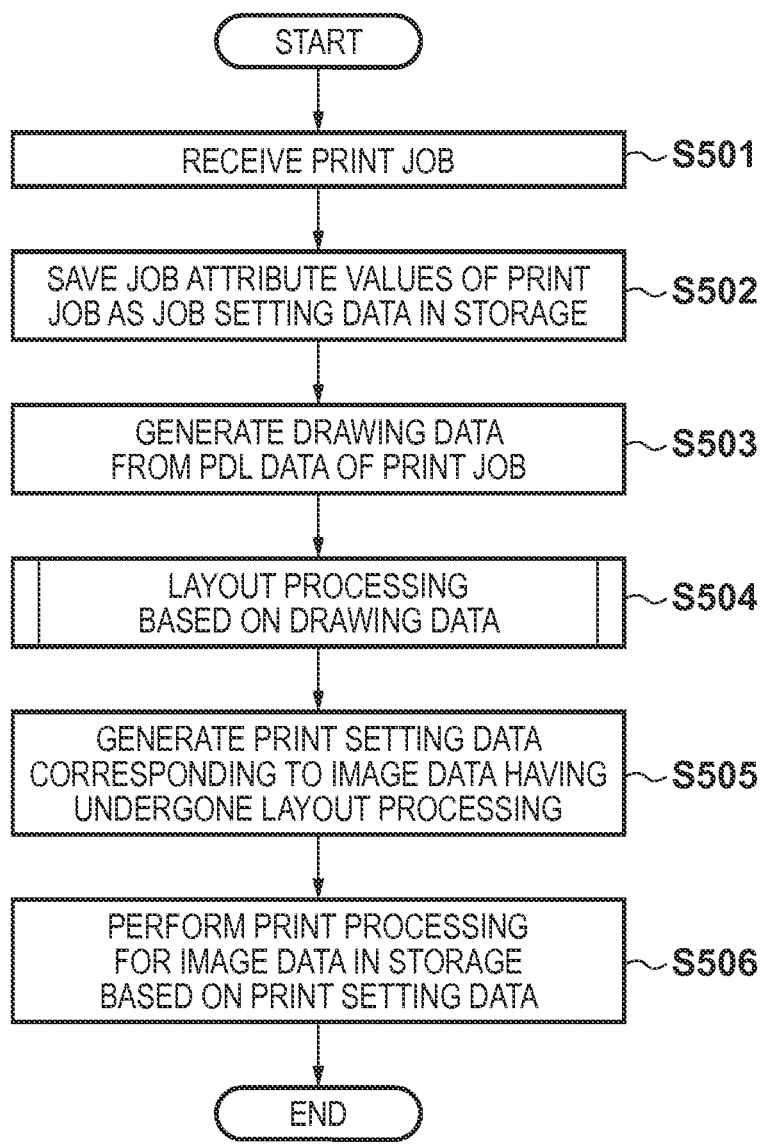
FIG. 5A is a flowchart showing a bookbinding processing sequence to be executed by an image processing apparatus 120 based on a print job according to the first embodiment.
Figure 5B:
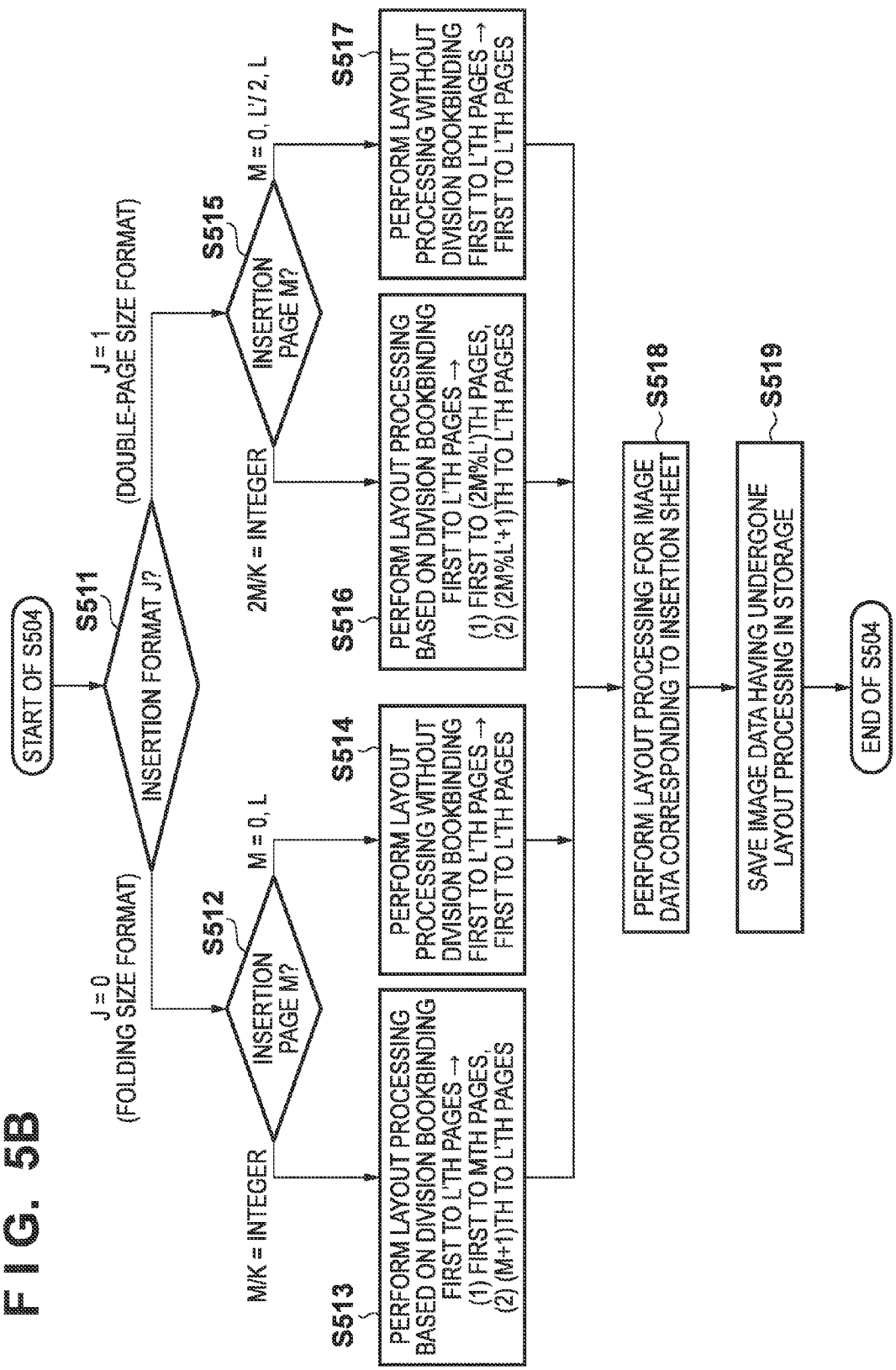
FIG. 5B is a flowchart showing a processing sequence to be executed in step S504 of FIG. 5A.

Bookbinding processing to be executed based on a print job in the image processing apparatus 120 according to the embodiment will be explained with reference to FIGS. 5A and 5B. Note that the operations of the respective steps of flowcharts shown in FIGS. 5A and 5B are implemented by the image processing apparatus 120 by reading out a control program from the storage 124, loading it in a RAM (not shown), and executing it by the CPU 121.

First, in step S501, the image processing apparatus 120 receives, from the information processing apparatus 100, a print job for bookbinding printing including PDL data of a plurality of pages and setting data regarding an insertion sheet. Accordingly, the image processing apparatus 120 accepts the print job for bookbinding printing.

In step S502, the image processing apparatus 120 interprets job attribute values included in the received print job, and saves the interpretation result as "job setting data" in the storage 124. Data corresponding to the job attribute values shown in FIGS. 4A and 4B are saved as job setting data in the storage 124. The job setting data includes setting data regarding original data such as an original page count L, and setting data regarding an insertion sheet such as an insertion format J, insertion page M, and printing/non-printing N on an insertion sheet.

The job setting data further includes a count K of original pages to be assigned to (laid out on) one sheet forming a bookbinding product. In the embodiment, to assign the originals of two pages to each of the obverse and reverse surfaces of one sheet, the original page count per sheet K=4. When a printing method set for the print job is folding bookbinding, an original page count L' for layout processing is added to the job setting data. A value obtained by adjusting L to become a multiple of K is set as L'. That is, for folding bookbinding, to print every K pages on one sheet, image data of pages corresponding to a multiple of K need to be prepared. For example, when the original page count L=10 is set as a job attribute value in the print job, L'=12 is set by adding two blank pages.

In step S503, the image processing apparatus 120 interprets PDL data included in the received print job, and executes rendering processing based on intermediate data obtained by the interpretation, generating drawing data. In the embodiment, all the PDL data, intermediate data, and drawing data correspond to original data.

In step S504, the image processing apparatus 120 executes layout processing by the image data processing unit 128 based on the drawing data obtained by rendering processing. In particular, the image processing apparatus 120 executes different layout processes depending on the insertion format J and insertion page M included in the job setting data saved in the storage 124. In the embodiment, as the insertion format J, J=0 corresponds to the folding size format, and J=1 corresponds to the double-page size format.

Details of the layout processing in step S504 will be explained with reference to FIG. 5B. First, in step S511, the image processing apparatus 120 refers to the insertion format J included in the job setting data, and determines which of the folding size format (J=0) and double-page size format (J=1) is set as the insertion format of an insertion sheet to a bookbinding product. If the image processing apparatus 120 determines that the insertion format is the folding size format (J=0), it advances the process to step S512; if it determines that the insertion format is the double-page size format (J=1), to step S515.

(Case in which Insertion Format is Folding Size Format (J=0))

In step S512, the image processing apparatus 120 determines which of a multiple of the original page count K per sheet (M/K=integer), M=0 (first page), or L (final page) is the insertion page M included in the job setting data. If the image processing apparatus 120 determines that the insertion page M is a multiple of K, it advances the process to step S513. If the image processing apparatus 120 determines in step S512 that the insertion page M is M=0 (first page) or L (final page), it advances the process to step S514.

In step S512, the image processing apparatus 120 decides whether to perform layout processing based on division bookbinding in step S513. More specifically, when the insertion position (insertion page) of an insertion sheet that is designated by the print job is a position before the first page of the body or after the final page of the body in a bookbinding product to be generated, the image processing apparatus 120 decides not to perform division bookbinding, and advances the process to step S514.

In step S513, the image processing apparatus 120 performs layout processing based on division bookbinding for drawing data of a plurality of pages corresponding to the body of a bookbinding product to be generated, thereby generating image data having undergone the layout processing.

In step S513, first, the image processing apparatus 120 divides drawing data of a plurality of pages corresponding to the body of a bookbinding product to be generated into the first and second drawing data groups (first and second original data groups). When the insertion sheet has the folding size format, the image processing apparatus 120 divides drawing data of a plurality of pages corresponding to the body of the bookbinding product into the first and second drawing data groups by using, as the boundary, the insertion position of an insertion sheet that is designated in the accepted print job. The first and second drawing data groups correspond to the first and second original data groups which include successive original data and are used to generate the first and second bookbinding products by dividing a bookbinding product to be generated.

In the embodiment, the position between the Mth and (M+1)th pages of the body is designated as the insertion position based on the insertion page. Thus, the image processing apparatus 120 divides drawing data of L' pages of the body into the first drawing data group including drawing data of the first to Mth pages and the second drawing data group including drawing data of the (M+1)th to L'th pages so that an insertion sheet is inserted between the Mth and (M+1)th pages of the body in the bookbinding product.

Then, in step S513, the image processing apparatus 120 performs layout processing to lay out drawing data included in the first and second drawing data groups to a plurality of image data aligned in the printing order when sequentially generating the first and second bookbinding products. More specifically, the image processing apparatus 120 lays out drawing data included in the first drawing data group to one or more image data corresponding to the first drawing data group. Also, the image processing apparatus 120 lays out drawing data included in the second drawing data group to one or more image data corresponding to the second drawing data group. Accordingly, a plurality of image data having undergone the layout processing are generated. After that, the image processing apparatus 120 advances the process to step S518.

In step S514, the image processing apparatus 120 does not perform layout processing based on division bookbinding, unlike step S513. In step S514, the image processing apparatus 120 performs layout processing to lay out drawing data (drawing data of the first to L'th pages) of a plurality of undivided pages to a plurality of image data aligned in the printing order when generating a bookbinding product. Then, the image processing apparatus 120 advances the process to step S518.

(Case in which Insertion Format is Double-Page Size Format (J=1))

In step S515, the image processing apparatus 120 determines whether double (2M) the insertion page M included in the job setting data is a multiple of K (2M/K=integer), or the insertion page M is M=0 (first page), L'/2 (center page of the body of the bookbinding product), or L (final page). If the image processing apparatus 120 determines that 2M is a multiple of K, it advances the process to step S516. If the image processing apparatus 120 determines in step S515 that the insertion page M is M=0 (first page), L'/2 (center page of the body of the bookbinding product), or L (final page), it advances the process to step S517.

In step S515, the image processing apparatus 120 decides whether to perform layout processing based on division bookbinding in step S516. Similar to step S512, when the insertion position (insertion page) of an insertion sheet that is designated by the print job is a position before the first page of the body or after the final page of the body in a bookbinding product to be generated, the image processing apparatus 120 decides not to perform division bookbinding, and advances the process to step S517. Also, when the insertion position of an insertion sheet is a position where the insertion sheet can be spread at the center of the body of a bookbinding product to be generated when the insertion sheet is inserted (M=L'/2), the image processing apparatus 120 decides not to perform division bookbinding, and advances the process to step S517.

In step S516, the image processing apparatus 120 performs layout processing based on division bookbinding for drawing data of a plurality of pages corresponding to the body of a bookbinding product to be generated, thereby generating image data having undergone the layout processing.

In step S516, first, the image processing apparatus 120 divides drawing data of a plurality of pages corresponding to the body of a bookbinding product into the first and second drawing data groups (first and second original data groups). When the insertion sheet has the double-page size format, the image processing apparatus 120 executes the division processing by using, as the boundary, a position determined so that the insertion sheet can be spread in either of the first and second bookbinding products to be generated in correspondence with the first and second drawing data groups after division.

In the embodiment, the image processing apparatus 120 sets a boundary page (division position) D=2M % L', and divides drawing data of L' pages of the body at the boundary between the Dth and (D+1)th pages in drawing data of a plurality of pages of the body so that it is set to insert an insertion sheet between the Dth and (D+1)th pages of the body in the bookbinding product. In this case, "%" is a remainder operator, and (2M % L') represents a remainder obtained when M is doubled and 2M is divided by the total page count L' of the body of the bookbinding product.

Then, in step S516, similar to step S513, the image processing apparatus 120 performs layout processing to lay out drawing data included in the first and second drawing data groups to a plurality of image data aligned in the printing order when sequentially generating the first and second bookbinding products. As a result, a plurality of image data having undergone the layout processing are generated. After that, the image processing apparatus 120 advances the process to step S518.

In the embodiment, when the insertion format is the double-page size format (J=1), drawing data of a plurality of pages of the body are divided not after the Mth page as in the folding size format (J=0), but after the Dth (=2M % L') page, and then layout processing is performed. More specifically, the image processing apparatus 120 divides drawing data of L' pages of the body into drawing data of the first to Dth pages and drawing data of the (D+1)th to L'th pages, and performs layout processing (based on division bookbinding) for the respective drawing data groups after division. Even when 2M>L', the boundary page D of less than L' pages is obtained by the remainder operation based on L'.

In step S517, similar to step S514, the image processing apparatus 120 performs layout processing for drawing data of the first to L'th undivided pages of the body. The image processing apparatus 120 then advances the process to step S518. Note that the layout processing in steps S513, S514, S516, and S517 in the embodiment corresponds to processing by the first layout unit. In the embodiment, the layout processing is implemented by laying out two original data included in the same drawing data group to each image data corresponding to the obverse or reverse surface of a sheet of the double-page size to be printed, which will be described later.

After that, the image processing apparatus 120 performs layout processing complying with designation of the insertion position (insertion page) for a plurality of image data having undergone the layout processing in step S513, S514, S516, or S517, and image data corresponding to the insertion sheet. More specifically, in step S518, the image processing apparatus 120 performs layout processing for the insertion sheet in accordance with the printing/non-printing N on the insertion sheet and the insertion position (insertion page) that are included in the job setting data. By this processing, the image processing apparatus 120 generates a plurality of image data aligned in the printing order for bookbinding printing. Note that the layout processing in step S518 in the embodiment corresponds to processing by the second layout unit.

In step S518, first, the image processing apparatus 120 generates image data corresponding to the insertion sheet based on the printing/non-printing N. When the insertion sheet has the folding size format, the image processing apparatus 120 lays out the image data corresponding to the insertion sheet at the boundary position between the image data corresponding to the first drawing data group and that corresponding to the second drawing data group in the plurality of image data aligned in the printing order. To the contrary, when the insertion sheet has the double-page size format, the image processing apparatus 120 executes the following control. The image processing apparatus 120 lays out the image data corresponding to the insertion sheet at a position corresponding to the designated insertion position in the image data corresponding to the first drawing data group or in the image data corresponding to the second drawing data group in the plurality of image data aligned in the printing order.

Upon completion of the layout processing in step S518, the image processing apparatus 120 saves the image data having undergone the layout processing in the storage 124 in step S519. The image processing apparatus 120 then advances the process to step S505.

In step S505, the image processing apparatus 120 generates print setting data corresponding to the image data having undergone the layout processing based on the job setting data and the image data having undergone the layout processing that have been saved in the storage 124. The image processing apparatus 120 saves the generated data in the storage 124. The print setting data generated in step S505 includes, for example, the following settings (which will be described later with reference to FIGS. 7A and 9A):

printing method: single-sided printing or double-sided printing paper size/paper feed tray information/paper type information folding setting: start flag, continuation flag, end flag, or none Finally, in step S506, the image processing apparatus 120 outputs a plurality of image data having undergone the layout processing to the printer engine 129, and causes the printer engine 129 to execute print processing in accordance with the print setting data generated in step S505. By performing bookbinding printing based on the plurality of image data having undergone the layout processing, the image processing apparatus 120 generates a final bookbinding product including the first and second bookbinding products in which the insertion sheet is inserted at the designated insertion position.

In step S506, the image processing apparatus 120 generates a final bookbinding product as follows depending on which of the folding size format and double-page size format is set for the insertion sheet. When the insertion sheet has the folding size format, the image processing apparatus 120 executes the following control. The image processing apparatus 120 sequentially generates the first bookbinding product based on image data corresponding to the first drawing data group, a printed material based on image data corresponding to the insertion sheet, and the second bookbinding product based on image data corresponding to the second drawing data group. The generated first bookbinding product, the printed material corresponding to the insertion sheet, and the second bookbinding product form a final bookbinding product.

When the insertion sheet has the double-page size format, the image processing apparatus 120 executes the following control. The image processing apparatus 120 sequentially generates the insertion sheet-inserted first bookbinding product based on image data corresponding to the first drawing data group and image data corresponding to the insertion sheet, and the second bookbinding product based on image data corresponding to the second original data group. Alternatively, the image processing apparatus 120 sequentially generates the first bookbinding product based on image data corresponding to the first original data group, and the insertion sheet-inserted second bookbinding product based on image data corresponding to the second original data group and image data corresponding to the insertion sheet. The generated first and second bookbinding products form a final bookbinding product.

In this way, regardless of which of the folding size and double-page size is designated for an insertion sheet, the image processing apparatus 120 can properly insert the insertion sheet into a bookbinding product to be finally generated. More specifically, when an insertion sheet of the folding size format is used, insertion of the insertion sheet into an arbitrary portion in a bookbinding product, implementation of which has been difficult, can be implemented based on division bookbinding. When an insertion sheet of the double-page size format is used, insertion of the insertion sheet into an arbitrary portion in a bookbinding product to be generated to enable spread of the insertion sheet can be implemented based on division bookbinding.

<Use Example 1 of Insertion Sheet of Folding Size Format>

Figure 7A:
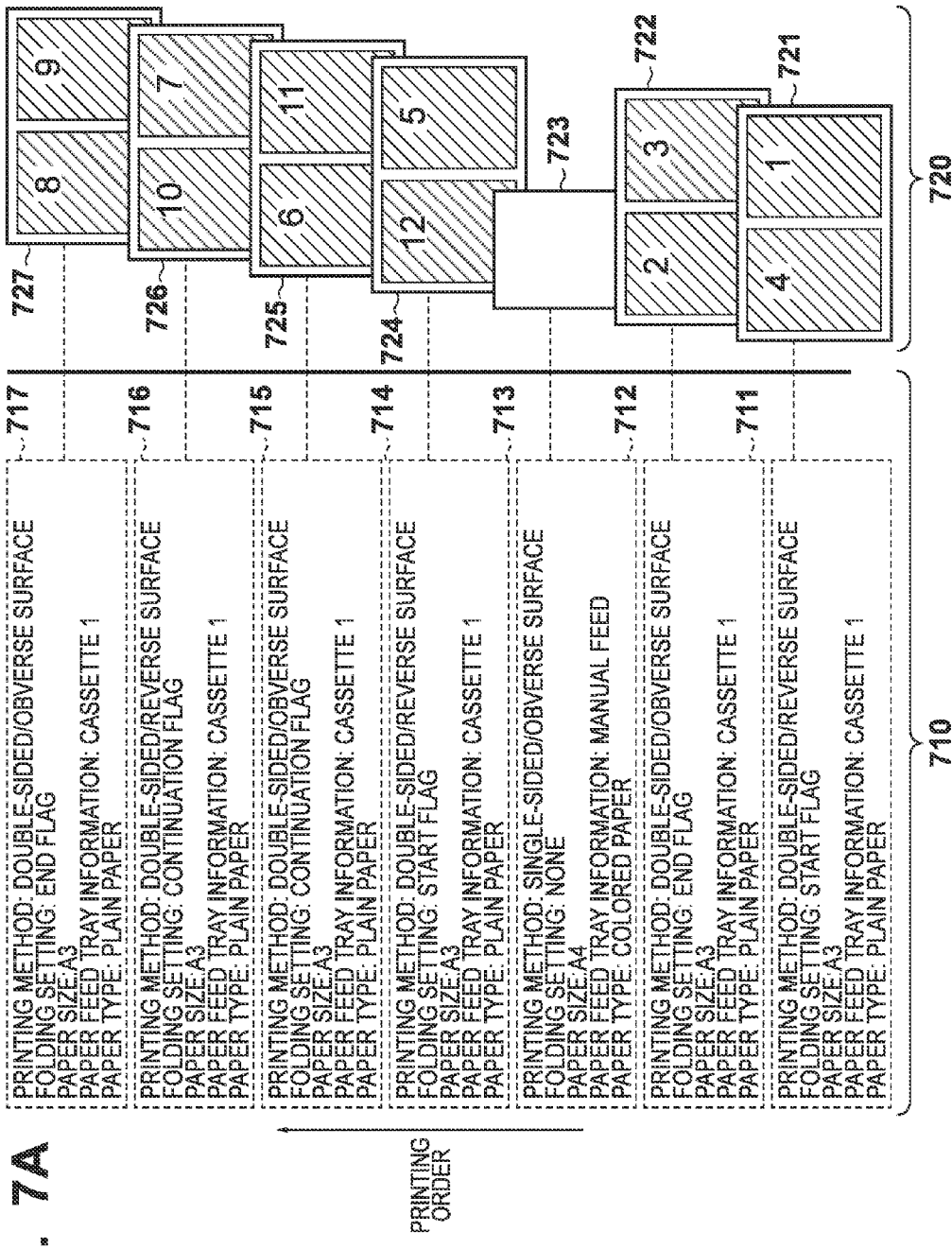
FIG. 7A is a view exemplifying print setting data and image data generated by layout processing when an insertion sheet of the folding size format is used according to the first embodiment.
Figure 7B:
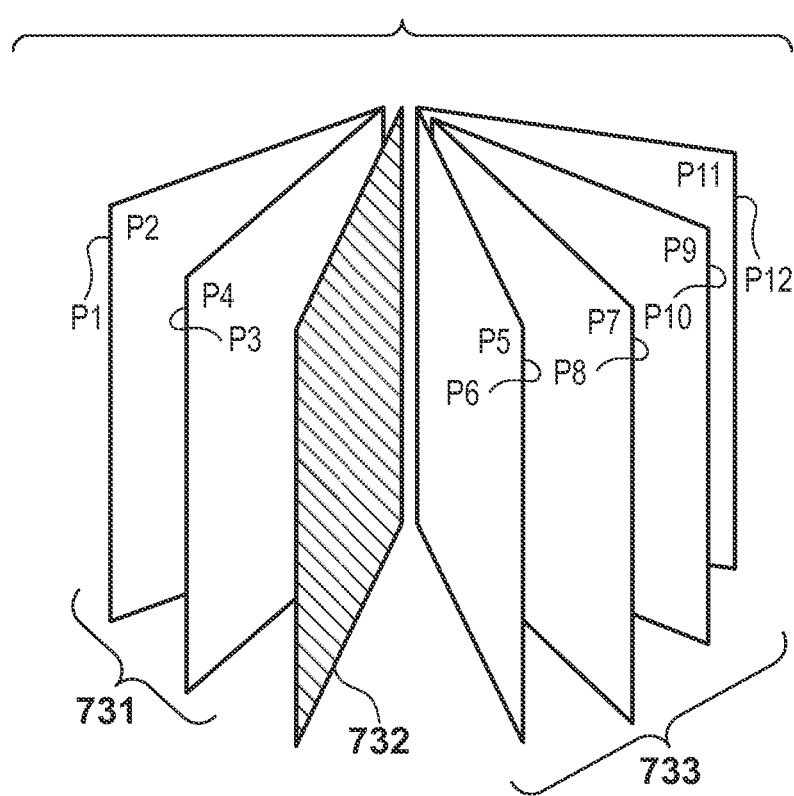
FIG. 7B is a view exemplifying a bookbinding product generated based on the print setting data and image data in FIG. 7A.

A plurality of examples when the image processing apparatus 120 executes the processes according to the flowcharts of FIGS. 5A and 5B will be explained. First, an example in which the image processing apparatus 120 performs bookbinding processing using an insertion sheet of the folding size format (J=0) based on the print job 400 will be described. FIG. 7A shows print setting data 711 to 717 and image data 721 to 727 corresponding to the print job 400 (FIG. 4A). FIG. 7B exemplifies a bookbinding product obtained as a result of performing print processing for the image data 721 to 727 in accordance with the print setting data 711 to 717 shown in FIG. 7A.

The image processing apparatus 120 receives the print job 400 from the information processing apparatus 100 (step S501), interprets attribute values included in the job attribute portion 401, and saves them as job setting data in the storage 124 (step S502). The job setting data includes the printing method=folding bookbinding, the insertion format J=0 (folding size format), and the original size=A3. Also, the job setting data includes settings such as the original page count L=12, the insertion page M=4, the printing/non-printing N on an insertion sheet=0, the paper settings of an insertion sheet=manual feed/colored paper, and the paper settings of the body=A3/cassette 1/plain paper 1. Since the original page count L=12, L need not be adjusted to a multiple of K=4, and the original page count L' for layout=12 (=L).

The image processing apparatus 120 interprets PDL data included in the print job 400, and performs rendering processing, generating drawing data (step S503). In the embodiment, the printer driver in the information processing apparatus 100 has not performed layout processing for the PDL data included in the print job 400. Since non-printing is set (N=0) for the insertion sheet, the print job 400 does not include PDL data corresponding to the insertion sheet. Hence, when the image processing apparatus 120 performs rendering processing for this PDL data, drawing data of 12 pages corresponding to the originals of the first to 12th pages are generated, as represented by 610 in FIG. 6.

Thereafter, the image processing apparatus 120 performs layout processing for the drawing data generated by the rendering processing (step S504). In the job setting data saved in the storage 124, the insertion format J=0 (folding size format), and the insertion page M=4. Thus, the image processing apparatus 120 advances the process to step S513. In step S513, the image processing apparatus 120 divides the drawing data of 12 pages (610 in FIG. 6) into drawing data of the first to fourth (=M) pages and drawing data of the fifth (=M+1) to 12th (=L') pages, and performs layout processing for the respective drawing data groups after the division. As a result, image data having undergone the layout processing are generated. Since non-printing is set for the insertion sheet (N=0), the image processing apparatus 120 executes layout processing using image data of a blank sheet of the folding size as image data of the insertion sheet (step S518).

In FIG. 7A, 720 conceptually represents all the image data 721 to 727 which have been generated by the layout processing and saved in the storage 124. FIG. 7A shows a state in which the image data 721 to 727 are saved in the storage 124 while they are laid out in the printing order, as indicated by an arrow. The image processing apparatus 120 performs division bookbinding based on the image data 721 and 722, and the image data 724 to 727, respectively, generating individual bookbinding products (first and second bookbinding products). The image data 723 is image data corresponding to an insertion sheet to be inserted between the two bookbinding products to be generated.

In FIG. 7A, 710 represents the print setting data 711 to 717 corresponding to the image data 721 to 727, respectively. As represented by 710 in FIG. 7A, the image processing apparatus 120 generates the print setting data 711 to 717 to make settings included in the job setting data correspond in the printing order to the respective image data 721 to 727 generated by the layout processing (step S505). The settings of items ("printing method", "folding setting", "paper size", "paper feed tray information", and "paper type") included in the print setting data 711 to 717 will be explained.

As a printing method for corresponding image data, single-sided printing or double-sided printing, and obverse surface printing or reverse surface printing are set as the "printing method". More specifically, "double-sided/reverse surface" and "double-sided/obverse surface" are set as the "printing method" respectively in the print setting data 711 and 712 corresponding to the image data 721 and 722 of the first bookbinding product. Also, in the print setting data 714 to 717 corresponding to the image data 724 to 727 of the second bookbinding product, "double-sided/reverse surface" and "double-sided/obverse surface" are set as the "printing method" alternately in the printing order. For the image data 723 of an insertion sheet, "non-printing" is set as an insertion sheet setting in the job setting data, so "single-sided/obverse surface" is formally set as the "printing method" in the corresponding print setting data 713.

The paper settings (A3/cassette 1/plain paper) of the body in the job setting data are set as the "paper size", "paper feed tray information", and "paper type" of the print setting data 711, 712, and 714 to 717 corresponding to the first and second bookbinding products. In contrast, the paper settings (manual feed/colored paper) of an insertion sheet are set as the "paper feed tray information" and "paper type" of the print setting data 713 corresponding to the insertion sheet, and "A4" is set as the "paper size". The A4 size corresponds to the folding size, and is set to be half the size of the paper size (A3 size here) of the body.

One of the "start flag", "continuation flag", "end flag", and "none" is set as the "folding setting" in each of the print setting data 711 to 717. The image processing apparatus 120 executes folding processing for a bundle of printed materials obtained based on image data from image data for which the "start flag" of folding processing is set, to one for which the "end flag" is set. Note that the "continuation flag" is a flag which is set for image data between image data for which the "start flag" is set and image data for which the "end flag" is set. The "continuation flag" represents that image data is subjected to folding processing. Whether to perform folding processing for image data other than one for which the "start flag" or "end flag" is set can be determined based on the presence/absence of the "continuation flag" setting.

In accordance with the settings of the above-described items, the image processing apparatus 120 performs print processing for a plurality of sheets (step S506). More specifically, first, the image processing apparatus 120 executes double-sided printing based on the image data 721 and 722 on one A3-size plain sheet in accordance with the print setting data 711 and 712, generating a (single) printed material forming the first bookbinding product. Further, the image processing apparatus 120 executes folding processing (saddle stitching) for the single printed material as a bundle in accordance with the "folding setting", generating the first bookbinding product.

Then, the image processing apparatus 120 executes single-sided printing based on the image data 723 on one A4-size colored sheet in accordance with the print setting data 713, generating a printed material corresponding to an insertion sheet. In this example, however, "non-printing" is set as an insertion sheet setting, so no printing is actually done on the insertion sheet. Also, since the "folding setting" is set to "none", no folding processing is performed for the insertion sheet.

Thereafter, the image processing apparatus 120 executes double-sided printing based on the image data 724 to 727 on two A3-size plain sheets in accordance with the print setting data 714 to 717, generating (two) printed materials forming the second bookbinding product. Further, the image processing apparatus 120 executes folding processing (saddle stitching) for a bundle of the two printed materials in accordance with the "folding setting", generating the second bookbinding product.

As a result of performing print processing for the image data 721 to 727 in accordance with the print setting data 711 to 717 shown in FIG. 7A, as described above, the image processing apparatus 120 generates and outputs a bookbinding product shown in FIG. 7B. The bookbinding product shown in FIG. 7B includes a first bookbinding product 731 formed from printed materials corresponding to the originals of the first to fourth pages, an insertion sheet 732 between printed materials corresponding to the originals of the fourth and fifth pages, and a second bookbinding product 733 formed from printed materials corresponding to the originals of the fifth to 12th pages. The image processing apparatus 120 outputs the first bookbinding product 731, insertion sheet 732, and second bookbinding product 733 sequentially to overlap each other, generating a final bookbinding product. In this manner, the image processing apparatus 120 can generate a bookbinding product in which the insertion sheet is inserted between the final page (fourth page of the body) of the first bookbinding product and the first page (fifth page of the body) of the second bookbinding product. That is, the image processing apparatus 120 can generate a bookbinding product in which the insertion sheet is inserted at the designated position.

<Use Example 2 of Insertion Sheet of Folding Size Format>

Next, a case in which the insertion page M is different from that in use example 1 described above will be explained as another example when the image processing apparatus 120 performs bookbinding processing using an insertion sheet of the folding size format (J=0) based on the print job 400 (FIG. 4A). More specifically, a case in which the insertion page M=0 (first page) or L (final page) will be described. In this case, layout processing differs from that in use example 1, and the image processing apparatus 120 performs layout processing not in step S513 but in step S514 without performing division bookbinding.

This use example assumes that not M=4 but M=0 (first page) or M=12 (final page) is set as the attribute value of the insertion page M included in the print job 400 (FIG. 4A) received by the image processing apparatus 120. The image processing apparatus 120 performs rendering processing for PDL data included in the print job 400, generating drawing data of 12 pages corresponding to the originals of the first to 12th pages represented by 610 of FIG. 6, similar to the above-mentioned use example 1 (step S503).

Then, the image processing apparatus 120 performs layout processing for the drawing data generated by the rendering processing (step S504). In this use example, the insertion format J=0 (folding size format), and the insertion page M=0 or 12 in the job setting data saved in the storage 124. Thus, the image processing apparatus 120 advances the process to step S514. In step S514, the image processing apparatus 120 performs layout processing for drawing data (610 in FIG. 6) of the 12 pages (first to 12th (=L') pages) of the body without dividing them (unlike step S513).

After that, the image processing apparatus 120 performs layout processing using image data of a blank sheet of the folding size as image data of the insertion page M (step S518). At this time, image data corresponding to the insertion sheet is laid out on the first page for M=0, or the final page for M=12. As a result, image data having undergone the layout processing are generated.

In FIG. 8, 800 exemplifies a bookbinding product obtained as a result of performing bookbinding processing using an insertion sheet of the folding size format when the insertion page M=0 (first page). In this case, the image processing apparatus 120 generates a bookbinding product including an insertion sheet 801 (of colored paper) arranged on the first page, and a bookbinding product 802 formed from printed materials (of plain paper) corresponding to the originals of the first to 12th pages of the body subsequent to the insertion sheet 801. To the contrary, in FIG. 8, 810 exemplifies a bookbinding product obtained as a result of performing bookbinding processing using an insertion sheet of the folding size format when the insertion page M=12 (final page). In this case, the image processing apparatus 120 generates a bookbinding product including a bookbinding product 811 formed from printed materials (of plain paper) corresponding to the originals of the first to 12th pages of the body, and an insertion sheet 812 (of colored paper) arranged on the final page subsequent to the bookbinding product 811. The image processing apparatus 120 outputs the bookbinding product 811 and insertion sheet 812 sequentially to overlap each other, generating a final bookbinding product. In this way, even when the first or final page is designated as the insertion position of an insertion sheet, the image processing apparatus 120 can generate a bookbinding product in which the insertion sheet is inserted at the designated position.

<Use Example 1 of Insertion Sheet of Double-Page Size Format>

As an example when the image processing apparatus 120 executes the processes according to the flowcharts of FIGS. 5A and 5B, an example in which the image processing apparatus 120 performs bookbinding processing using an insertion sheet of the double-page size (J=1) based on the print job 410 will be explained. FIG. 9A shows print setting data 911 to 917 and image data 921 to 927 corresponding to the print job 410 (FIG. 4B). FIG. 9B exemplifies a bookbinding product obtained as a result of performing print processing for the image data 921 to 927 in accordance with the print setting data 911 to 917 shown in FIG. 9A.

The image processing apparatus 120 receives the print job 410 from the information processing apparatus 100 (step S501), interprets attribute values included in the job attribute portion 411, and saves them as job setting data in the storage 124 (step S502). The job setting data includes the printing method=folding bookbinding, the insertion format J=1 (double-page size format), and the original size=A3. Also, the job setting data includes settings such as the original page count L=12, the insertion page M=8, the printing/non-printing N on an insertion sheet=1, the paper settings of an insertion sheet=manual feed/coated paper, and the paper settings of the body=A3/cassette 1/plain paper 1. Since the original page count L=12, L need not be adjusted to a multiple of K=4, and the original page count L' for layout=12 (=L).

The image processing apparatus 120 interprets PDL data included in the print job 410, and performs rendering processing, generating drawing data (step S503). In the embodiment, similar to the print job 400, the print job 410 includes PDL data which has not undergone layout processing and corresponds to the original of each page of the body. As for the insertion sheet, it is set to print on one surface (obverse surface). For this purpose, the print job 410 further includes, between PDL data of the eighth page of the body and that of the ninth page, PDL data which corresponds to the insertion sheet to print an image on the printing surface of the insertion sheet of the double-page size.

Figure 6:
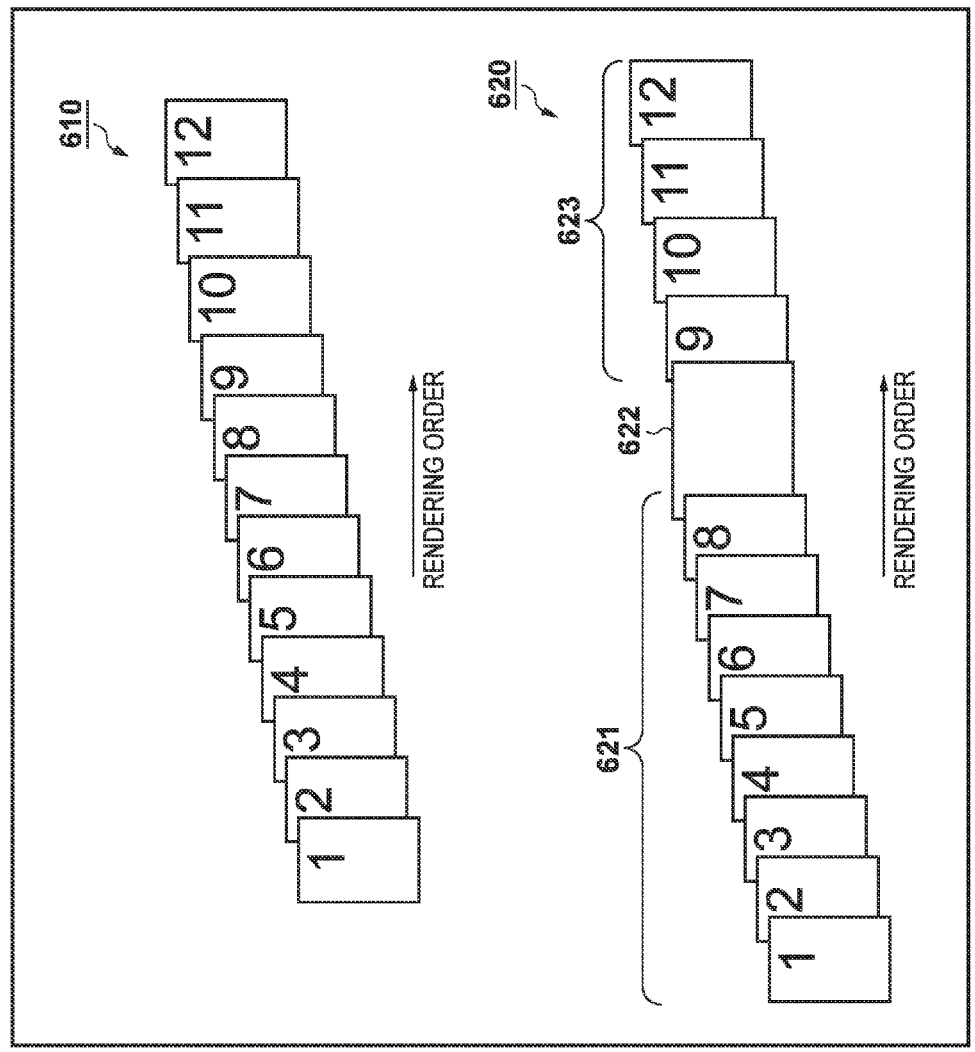
FIG. 6 is a view exemplifying drawing data generated by rendering processing according to the first embodiment.

When the image processing apparatus 120 executes rendering processing for this PDL data, drawing data of 13 pages represented by 620 in FIG. 6 are generated. More specifically, drawing data of 13 pages are generated, including drawing data 621 and 623 of 12 pages corresponding to the originals of the first to 12th pages, and drawing data 622 of one page of the double-page size corresponding to the insertion sheet. Drawing data corresponding to the insertion sheet is interposed between drawing data corresponding to the original of the eighth page and that corresponding to the original of the ninth page.

Then, the image processing apparatus 120 performs layout processing for the drawing data generated by the rendering processing (step S504). In the job setting data saved in the storage 124, the insertion format J=1 (double-page size format), and the insertion page M=8. Thus, the image processing apparatus 120 advances the process to step S516. In step S516, the image processing apparatus 120 performs layout processing by division bookbinding using drawing data of the body of the 12 pages out of drawing data of the 13 pages.

Since M=8 and L'=12, the boundary page D=2M % L'=4. That is, in step S516, the image processing apparatus 120 divides the drawing data 621 and 623 of the first to 12th pages of the body into drawing data of the first to fourth pages and drawing data of the fifth to 12th (=L') pages, and performs layout processing (based on division bookbinding) for the respective drawing data groups after the division. As for the insertion sheet, it is set to print (N=1). Thus, the image processing apparatus 120 performs layout processing using, as image data of the insertion sheet, image data based on the drawing data 622 of the insertion sheet of the double-page size that is arranged after the drawing data of the eighth page of the body (step S518).

In FIG. 9A, 920 conceptually represents all the image data 921 to 927 which have been generated by the layout processing and saved in the storage 124. FIG. 9A shows a state in which the image data 921 to 927 are saved in the storage 124 while they are laid out in the printing order, as indicated by an arrow. The image processing apparatus 120 performs division bookbinding based on the image data 921 and 922, and the image data 923 to 927, respectively, generating individual bookbinding products (first and second bookbinding products). Image data of the insertion sheet of the double-page size is laid out as the image data 927 after the image data 926 including data corresponding to the originals of the eighth and ninth pages of the body. When printed materials based on the image data 923 to 927 are bundled and folded, the insertion sheet is inserted as facing pages into the generated bookbinding product.

In FIG. 9A, 910 represents the print setting data 911 to 917 corresponding to the image data 921 to 927, respectively. As represented by 910 in FIG. 9A, the image processing apparatus 120 generates the print setting data 911 to 917 to make settings included in the job setting data correspond in the printing order to the respective image data 921 to 927 generated by the layout processing (step S505).

Print setting data for generating the first bookbinding product will be explained. "Double-sided/reverse surface" and "double-sided/obverse surface" are set as the "printing method" respectively in the print setting data 911 and 912 corresponding to the image data 921 and 922 of the first bookbinding product. The paper settings (A3/cassette 1/plain paper) of the body in the job setting data are set as the "paper size", "paper feed tray information", and "paper type" in the print setting data 911 and 912. Further, the "start flag" and "end flag" are set as the "folding setting" in the print setting data 911 and 912, respectively.

In step S506, in accordance with these settings, the image processing apparatus 120 performs double-sided printing based on the image data 921 and 922 of the body on one A3-size plain sheet, generating a (single) printed material forming the first bookbinding product. Further, the image processing apparatus 120 executes folding processing (saddle stitching) for the single printed material as a bundle in accordance with the "folding setting", generating the first bookbinding product.

Print setting data for generating the second bookbinding product will be explained. In the print setting data 913 to 916 corresponding to the image data 923 to 926 of the body out of the image data 923 to 927 of the second bookbinding product, "double-sided/reverse surface" and "double-sided/obverse surface" are set as the "printing method" alternately in the printing order. In contrast, "double-sided/obverse surface" is set as the "printing method" in the print setting data 917 corresponding to the image data 927 of the insertion sheet. In addition, the paper settings (A3/cassette 1/plain paper) of the body in the job setting data are set as the "paper size", "paper feed tray information", and "paper type" in the print setting data 913 to 916 corresponding to the body. The paper settings (A3/manual feed/coated paper) of the insertion sheet in the job setting data are set in the print setting data 917 corresponding to the insertion sheet. As the "folding setting", the "start flag" is set in the print setting data 913, the "end flag" is set in the print setting data 917, and the "continuation flag" is set in the print setting data 914 to 916.

In step S506, the image processing apparatus 120 executes double-sided printing based on the image data 923 to 926 of the body on two A3-size plain sheets in accordance with these settings, generating (two) printed materials forming the second bookbinding product. Also, the image processing apparatus 120 performs single-sided printing based on the image data 927 of the insertion sheet on one A3-size coated sheet, generating a (single) printed material forming the second bookbinding product. The single printed material serves as an insertion sheet to the second bookbinding product. Then, the image processing apparatus 120 bundles the two printed materials corresponding to the body and the single printed material corresponding to the insertion sheet, and executes folding processing for these printed materials in accordance with the "folding setting".

As a result of performing print processing for the image data 921 to 927 in accordance with the print setting data 911 to 917 shown in FIG. 9A, as described above, the image processing apparatus 120 generates a bookbinding product shown in FIG. 9B. The bookbinding product shown in FIG. 9B includes a first bookbinding product 931 formed from printed materials corresponding to the originals of the first to fourth pages, and a second bookbinding product 932 formed from printed materials corresponding to the originals of the fifth to 12th pages and a printed material 933 corresponding to the insertion sheet. The image processing apparatus 120 outputs the first bookbinding product 931 and the second bookbinding product 932 including the insertion sheet 933 sequentially to overlap each other, generating a final bookbinding product. In this fashion, the image processing apparatus 120 can generate a bookbinding product in which the insertion sheet is inserted between the eighth and ninth pages of the body. That is, the image processing apparatus 120 can generate a bookbinding product in which the insertion sheet is inserted at the designated position.

<Use Example 2 of Insertion Sheet of Double-Page Size Format>

Next, a case in which the insertion page M is different from that in use example 1 described above will be explained as another example when the image processing apparatus 120 performs bookbinding processing using an insertion sheet of the double-page size format (J=1) based on the print job 410 (FIG. 4B). More specifically, a case in which the insertion page M=0 (first page), L'/2 (center page), L (final page) will be described. In this case, layout processing differs from that in use example 1, and the image processing apparatus 120 performs layout processing in step S517 without performing division bookbinding for drawing data of the body. When the insertion format J=1 (double-page size format), unlike the insertion format J=0 (folding size format), layout processing is performed for image data of the body not only for the insertion page M=0 or L, but also for the insertion page M=L'/2 (center page) without performing division bookbinding.

This use example assumes that not M=8 but M=0 (first page), M=6 (=L'/2 (center page)), or M=12 (final page) is set as the attribute value of the insertion page included in the print job 410 (FIG. 4B) received by the image processing apparatus 120. The image processing apparatus 120 performs rendering processing for PDL data included in the print job 410, generating drawing data and image data, as represented by 620 in FIG. 6. More specifically, the drawing data 621 and 623 of 12 pages corresponding to the originals of the first to 12th pages, and the drawing data 622 corresponding to the insertion sheet are generated (step S503). Note that the drawing data 622 is arranged at a position corresponding to the insertion page M.

Then, the image processing apparatus 120 performs layout processing for the drawing data generated by the rendering processing (step S504). In this use example, the insertion format J=1 (double-page size format), and the insertion page M=0, 6, or 12 in the job setting data saved in the storage 124. Thus, the image processing apparatus 120 advances the process to step S517. In step S517, the image processing apparatus 120 performs layout processing without dividing the drawing data 621 and 623 of the body of the 12 pages corresponding to the first to 12th (=L') pages of the body (unlike step S516).

In step S518, the image processing apparatus 120 performs layout processing using, as image data of the insertion page M, the drawing data 622 corresponding to the insertion sheet of the double-page size. At this time, image data corresponding to the insertion sheet is laid out on the first page for M=0, the center page for M=6, or the final page for M=12. As a result, image data having undergone the layout processing are generated.

Figure 10:
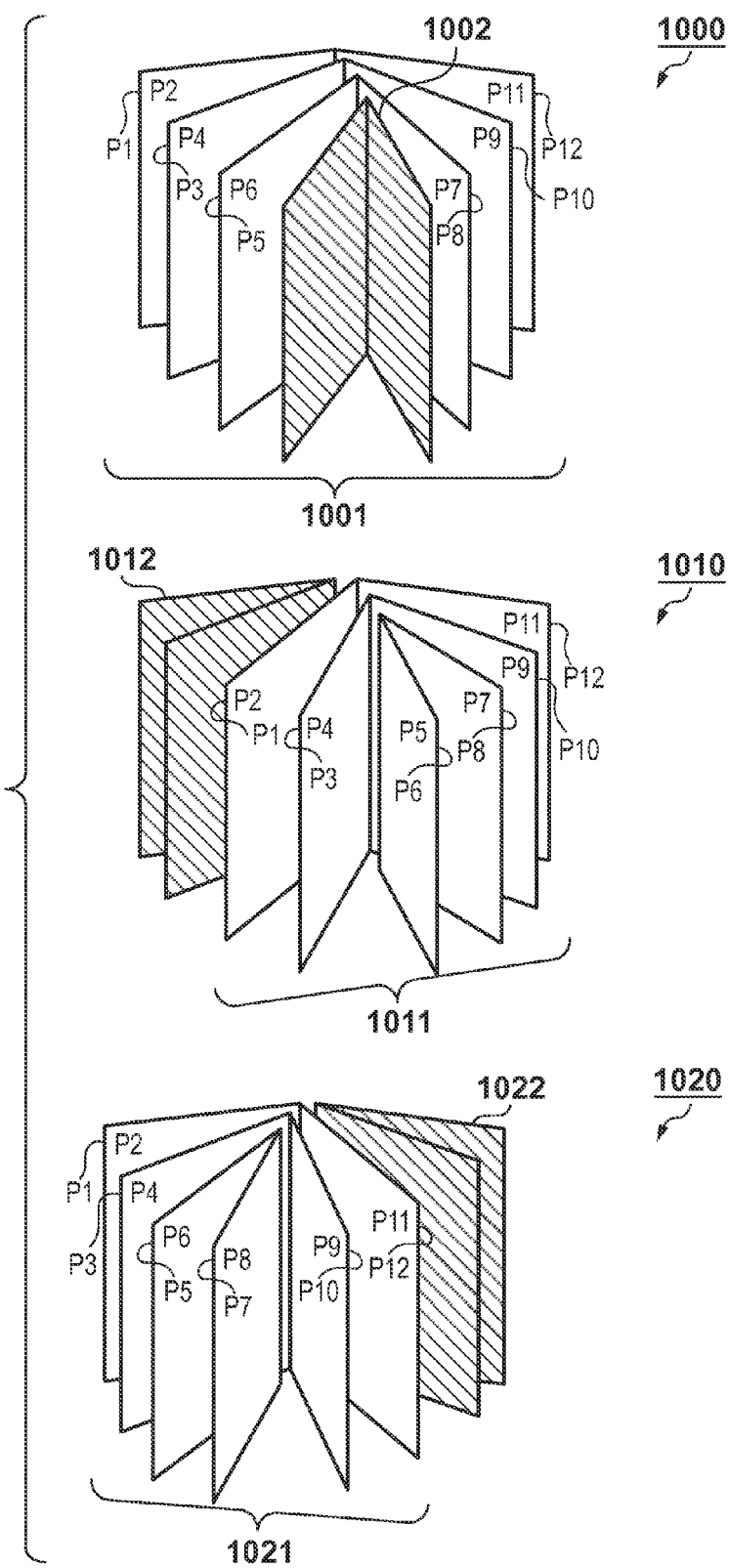
FIG. 10 is a view exemplifying bookbinding products generated when the insertion page M of an insertion sheet of the double-page size format=6 (center page), 0 (first page), and 12 (final page) according to the first embodiment.
Figure 11:
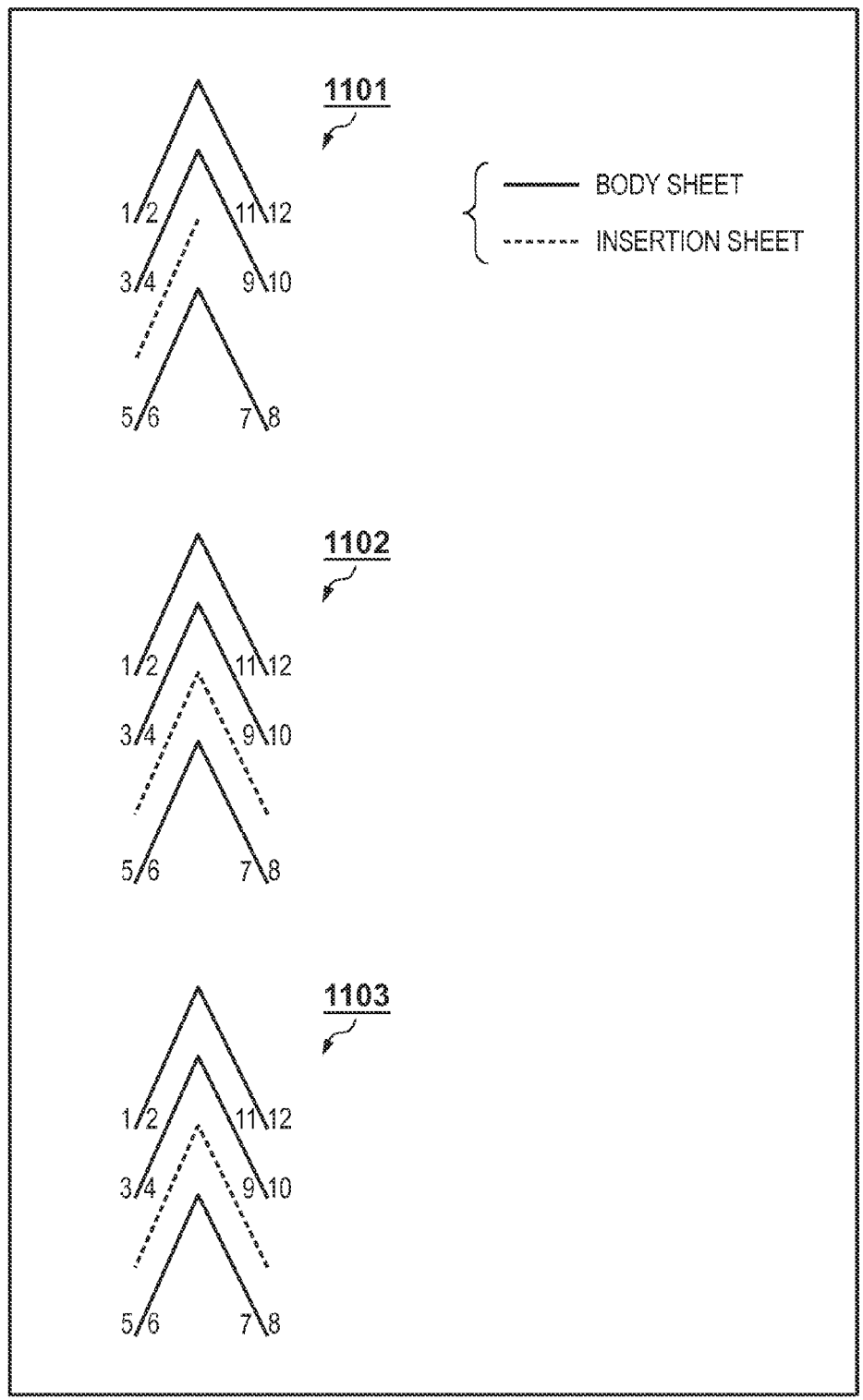
FIG. 11 is a view exemplifying bookbinding products each obtained when a sheet of the same or half size of sheets corresponding to the body is inserted into a bookbinding product based on folding bookbinding.

In FIGS. 10, 1000, 1010, and 1020 exemplify bookbinding products obtained as a result of performing bookbinding processing using an insertion sheet of the double-page size format when the insertion page M=6 (center page), M=0 (first page), and M=12 (final page). As shown in FIG. 10, for M=6, 0, and 12, the image processing apparatus 120 generates bookbinding products 1001, 1011, and 1021 each formed from printed materials (of plain paper) corresponding to the originals of the first to 12th pages of the body. Further, the image processing apparatus 120 generates bookbinding products in which insertion sheets 1002, 1012, and 1022 (of coated paper of the double-page size) having undergone folding processing are inserted at positions each corresponding to the insertion page M into the respective bookbinding products.

As shown in FIG. 10, for M=6 (1000), the insertion sheet 1002 having undergone folding processing is inserted as the center page into the bookbinding product 1001. For M=0 (1010), the insertion sheet 1012 having undergone folding processing is inserted as the first page into the bookbinding product 1011. For M=12 (1020), the insertion sheet 1022 having undergone folding processing is inserted as the final page into the bookbinding product 1021. Note that for M=6 (center page), printed materials corresponding to the body of the original, and an insertion sheet integrally undergo folding processing in print processing (step S506) based on image data having undergone layout processing, thereby generating a final bookbinding product.

As described above, according to the first embodiment, regardless of which of the folding size and double-page size is designated for an insertion sheet, the insertion sheet can be appropriately inserted into a bookbinding product to be finally generated. More specifically, when an insertion sheet of the folding size format is used, insertion of the insertion sheet into an arbitrary portion in a bookbinding product, implementation of which has been difficult, can be implemented based on division bookbinding. When an insertion sheet of the double-page size format is used, insertion of the insertion sheet into an arbitrary portion in a bookbinding product to be generated to enable spread of the insertion sheet can be implemented based on division bookbinding.

Second Embodiment

The second embodiment according to the present invention will be described. The first embodiment has described a case in which the image processing apparatus executes layout processing for image data to be actually printed, based on a print job created by the printer driver in the information processing apparatus in the printing system including the information processing apparatus and image processing apparatus. The second embodiment will explain a case in which before transmitting a print job from the information processing apparatus to the image processing apparatus, the printer driver in the information processing apparatus performs layout processing for image data for bookbinding printing. For simplicity, a description of a part common to the first embodiment will not be repeated.

In the second embodiment, an information processing apparatus 100 corresponds to an image processing apparatus which generates image data for bookbinding printing of printing images corresponding to original data on a plurality of sheets of the double-page size (first size), bundling the printed sheets, and folding them in the middle to generate a bookbinding product. In the second embodiment, a printer driver in the information processing apparatus 100 executes, for example, the processes in steps S501 to S504 to generate a plurality of image data having undergone layout processing. Further, the printer driver transmits the generated image data to an image processing apparatus 120. The image processing apparatus 120 generates print setting data corresponding to each received image data in step S505, and executes print processing for the image data based on the print setting data in step S506.

Although the above description assumes that the printer driver in the information processing apparatus 100 performs rendering processing for drawing data to generate image data, the image processing apparatus 120 may perform the rendering processing. In this case, the printer driver in the information processing apparatus 100 suffices to generate, in step S504 for original data corresponding to the originals of respective pages before rendering processing, PDL data representing how to perform layout processing for a plurality of image data in the printing order. Also, the printer driver suffices to set the generated PDL data in a print job and transmit them to the image processing apparatus 120. The image processing apparatus 120 suffices to perform rendering processing for PDL data of respective pages based on the PDL data included in the received print job.

The second embodiment can obtain the same effects as those of the first embodiment even when the information processing apparatus 100 executes layout processing for bookbinding printing in the image processing apparatus 120 in advance before transmitting a print job.

Other Embodiment

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-262652, filed Nov. 30, 2011, which is hereby incorporated by reference herein in its entirety.

What is claimed is:

1. An image processing apparatus which is capable of generating a book product by folding at least one sheet, comprising:
   a printing unit configured to print N pages of images onto a plurality of sheets, such that K (K<N) pages of images are printed on each of the plurality of sheets in total including both sides; and
   a control unit configured to control such that at least one sheet on which from 1st page to Mth (1<M<N, M is an integral multiplication of K) page of images are printed and at least one sheet on which from (M+1)th page to Nth page of images are printed are folded individually, based on that insertion of an additional sheet between the Mth page and the (M+1)th page is set.

2. The image processing apparatus according to claim 1, wherein a size of the additional sheet is half of a size of the sheet on which images are printed.

3. The image processing apparatus according to claim 1, wherein the control unit is configured to control such that at least one sheet on which from 1st page to Nth page of images are printed is folded in a batch, based on that insertion of the additional sheet prior to the 1st page or after the Nth page is set.

4. The image processing apparatus according to claim 1, wherein N is an integral multiplication of K.

5. The image processing apparatus according to claim 4, further comprising an adding unit configured to add, when a number of received pages is not an integral multiplication of K, at least one blank page so as to adjust the number to be N.

6. An image processing apparatus which is capable of generating a book product by folding at least one sheet, comprising:
   a printing unit configured to print N pages of images onto a plurality of sheets, such that K pages of images are printed on each side of each of the plurality of sheets; and
   a control unit configured to control such that at least one sheet on which pages of a number corresponding to a remainder obtained when a product of M (1<M<N, M is an integral multiplication of K) and 2 is divided by N are printed, and at least one sheet on which remaining pages are printed are folded individually, based on that insertion of an additional sheet between the Mth page and the (M+1)th page is set.

7. The image processing apparatus according to claim 6, wherein a size of the additional sheet is same as a size of the sheet on which images are printed.

8. The image processing apparatus according to claim 6, wherein the control unit is configured to control such that at least one sheet on which from 1st page to Nth page of images are printed is folded in a batch, based on that insertion of the additional sheet prior to the 1st page or after the Nth page is set.

9. The image processing apparatus according to claim 6, wherein N is an integral multiplication of K.

10. The image processing apparatus according to claim 9, further comprising an adding unit configured to add, when a number of received pages is not an integral multiplication of K, at least one blank page so as to adjust the number to be N.

11. An image processing apparatus which is capable of generating a book product by folding at least one sheet, comprising:
    a printing unit configured to print N pages of images onto a plurality of sheets, such that K (K<N) pages of images are printed on each of the plurality of sheets in total including both sides; and
    a control unit configured to control such that at least one sheet on which from 1st page to Mth (1<M<N, M is an integral multiplication of K) page of images are printed and at least one sheet on which from (M+1)th page to Nth page of images are printed are folded individually, based on that insertion of an additional sheet a size of which is half of a size of the sheet on which images are printed between the Mth page and the (M+1)th page is set, and to control such that at least one sheet on which pages of a number corresponding to a remainder obtained when a product of M (1<M<N, M is an integral multiplication of K) and 2 is divided by N are printed, and at least one sheet on which remaining pages are printed are folded individually, based on that insertion of an additional sheet a size of which is same as a size of the sheet on which images are printed between the Mth page and the (M+1)th page is set.

12. The image processing apparatus according to claim 11, wherein the control unit is configured to control such that at least one sheet on which from 1st page to Nth page of images are printed is folded in a batch, based on that insertion of the additional sheet prior to the 1st page or after the Nth page is set.

13. The image processing apparatus according to claim 11, wherein N is an integral multiplication of K.

14. The image processing apparatus according to claim 13, further comprising an adding unit configured to add, when a number of received pages is not an integral multiplication of K, at least one blank page so as to adjust the number to be N.

15. A control method for controlling an image processing apparatus which is capable of generating a book product by folding at least one sheet, the method comprising steps of:
    printing N pages of images onto a plurality of sheets, such that K (K<N) pages of images are printed on each of the plurality of sheets in total including both sides; and
    controlling such that at least one sheet on which from 1st page to Mth (1<M<N, M is an integral multiplication of K) page of images are printed and at least one sheet on which from (M+1)th page to Nth page of images are printed are folded individually, based on that insertion of an additional sheet between the Mth page and the (M+1)th page is set.

16. A control method for controlling an image processing apparatus which is capable of generating a book product by folding at least one sheet, the method comprising steps of:
    printing N pages of images onto a plurality of sheets, such that K pages of images are printed on each side of each of the plurality of sheets; and
    controlling such that at least one sheet on which pages of a number corresponding to a remainder obtained when a product of M (1<M<N, M is an integral multiplication of K) and 2 is divided by N are printed, and at least one sheet on which remaining pages are printed are folded individually, based on that insertion of an additional sheet between the Mth page and the (M+1)th page is set.

17. A control method for controlling an image processing apparatus which is capable of generating a book product by folding at least one sheet, the method comprising steps of:
    printing N pages of images onto a plurality of sheets, such that K (K<N) pages of images are printed on each of the plurality of sheets in total including both sides; and
    controlling such that at least one sheet on which from 1st page to Mth (1<M<N, M is an integral multiplication of K) page of images are printed and at least one sheet on which from (M+1)th page to Nth page of images are printed are folded individually, based on that insertion of an additional sheet a size of which is half of a size of the sheet on which images are printed between the Mth page and the (M+1)th page is set, and controlling such that at least one sheet on which pages of a number corresponding to a remainder obtained when a product of M (1<M<N, M is an integral multiplication of K) and 2 is divided by N are printed, and at least one sheet on which remaining pages are printed are folded individually, based on that insertion of an additional sheet a size of which is same as a size of the sheet on which images are printed between the Mth page and the (M+1)th page is set.

18. A non-transitory computer-readable storage medium storing a computer program for causing a computer to execute steps of a control method for controlling an image processing apparatus which is capable of generating a book product by folding at least one sheet, the method comprising steps of:
    printing N pages of images onto a plurality of sheets, such that K (K<N) pages of images are printed on each of the plurality of sheets in total including both sides; and
    controlling such that at least one sheet on which from 1st page to Mth (1<M<N, M is an integral multiplication of K) page of images are printed and at least one sheet on which from (M+1)th page to Nth page of images are printed are folded individually, based on that insertion of an additional sheet between the Mth page and the (M+1)th page is set.

19. A non-transitory computer-readable storage medium storing a computer program for causing a computer to execute steps of a control method for controlling an image processing apparatus which is capable of generating a book product by folding at least one sheet, the method comprising steps of:
    printing N pages of images onto a plurality of sheets, such that K pages of images are printed on each side of each of the plurality of sheets; and
    controlling such that at least one sheet on which pages of a number corresponding to a remainder obtained when a product of M (1<M<N, M is an integral multiplication of K) and 2 is divided by N are printed, and at least one sheet on which remaining pages are printed are folded individually, based on that insertion of an additional sheet between the Mth page and the (M+1)th page is set.

20. A non-transitory computer-readable storage medium storing a computer program for causing a computer to execute steps of a control method for controlling an image processing apparatus which is capable of generating a book product by folding at least one sheet, the method comprising steps of:

printing N pages of images onto a plurality of sheets, such that K (K<N) pages of images are printed on each of the plurality of sheets in total including both sides; and controlling such that at least one sheet on which from 1st page to Mth (1<M<N, M is an integral multiplication of K) page of images are printed and at least one sheet on which from (M+1)th page to Nth page of images are printed are folded individually, based on that insertion of an additional sheet a size of which is half of a size of the sheet on which images are printed between the Mth page and the (M+1)th page is set, and controlling such that at least one sheet on which pages of a number corresponding to a remainder obtained when a product of M (1<M<N, M is an integral multiplication of K) and 2 is divided by N are printed, and at least one sheet on which remaining pages are printed are folded individually, based on that insertion of an additional sheet a size of which is same as a size of the sheet on which images are printed between the Mth page and the (M+1)th page is set.

* * * * *